(12) United States Patent
Mochizuki et al.

(10) Patent No.: US 6,909,453 B2
(45) Date of Patent: Jun. 21, 2005

(54) VIRTUAL TELEVISION PHONE APPARATUS

(75) Inventors: Yoshiyuki Mochizuki, Suita (JP);
Katsunori Orimoto, Neyagawa (JP);
Toshiki Hijiri, Hirakata (JP); Naoki
Ohtani, Osaka (JP); Toshiya Naka,
Nishinomiya (JP); Takeshi Yamamoto,
Yokohama (JP); Shigeo Asahara, Ikeda
(JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 255 days.

(21) Appl. No.: 10/322,724

(22) Filed: Dec. 19, 2002

(65) Prior Publication Data

US 2003/0117485 A1 Jun. 26, 2003

(30) Foreign Application Priority Data

Dec. 20, 2001 (JP) ...................................... 2001-387424

(51) Int. Cl.[7] .................................................. H04N 7/14
(52) U.S. Cl. .................................... 348/14.1; 348/14.01
(58) Field of Search ........................... 348/14.01–14.16; 709/204

(56) References Cited

U.S. PATENT DOCUMENTS

| | | | | |
|---|---|---|---|---|
| 5,347,306 A | * | 9/1994 | Nitta .......................... | 348/14.1 |
| 5,491,743 A | * | 2/1996 | Shiio et al. ............. | 379/202.01 |
| 5,880,731 A | | 3/1999 | Liles et al. | |
| 6,313,864 B1 | * | 11/2001 | Tabata et al. ............. | 348/14.02 |
| 6,825,873 B2 | * | 11/2004 | Nakamura et al. ........ | 348/14.02 |

FOREIGN PATENT DOCUMENTS

| | | | | |
|---|---|---|---|---|
| EP | 0 978 790 | | 2/2000 | |
| JP | 62-274962 | | 11/1987 | |
| JP | 05-153581 | | 6/1993 | |
| JP | 11-119791 | | 4/1999 | |
| JP | 11266212 A | * | 9/1999 | ........... H04B/17/00 |
| JP | 2001-87559 | | 4/2001 | |
| WO | WO 00/10099 | | 2/2000 | |

OTHER PUBLICATIONS

"MPEG–4 (*Moving Picture Experts Group Phase 4*) *image compression standard*", Nikkei Electronics, Nov. 1, 1999, (No. 756), pp. 99–117. In Japanese.

* cited by examiner

Primary Examiner—Wing F. Chan
(74) Attorney, Agent, or Firm—Wenderoth, Lind & Ponack, L.L.P.

(57) ABSTRACT

A communication unit 1 carries out voice communication, and a character background selection input unit 2 selects a CG character corresponding to a communication partner. A voice/music processing unit 5 performs voice/music processing required for the communication, a voice/music converting unit 6 converts voice and music, and a voice/music output unit outputs the voice and music. A voice input unit 8 acquires voice. A voice analyzing unit 9 analyzes the voice, and an emotion presuming unit 10 presumes an emotion based on the result of the voice analysis. A lips motion control unit 11, a body motion control unit 12 and an expression control unit 13 send control information to a 3-D image drawing unit 14 to generate an image, and a display unit 15 displays the image.

35 Claims, 12 Drawing Sheets

Fig. 3

CG Character Data Management Table 3a

| CG character ID | CG character name | CG character shape data address | clothing texture data address | expression pattern address | lips motion pattern address | thumbnail address |
|---|---|---|---|---|---|---|
| 1 | alien | xxx | before change:axp after change:acp | before conversation:aaa after starting conversation:baa | ppp | hhh |
| 2 | pig | yyy | before change:bxp after change:bcp | before conversation:bba after starting conversation:caa | qqq | kkk |
| 3 | girl A | zzz | before change:cxp after change:ccp | before conversation:aca after starting conversation:bac | rrr | mmm |

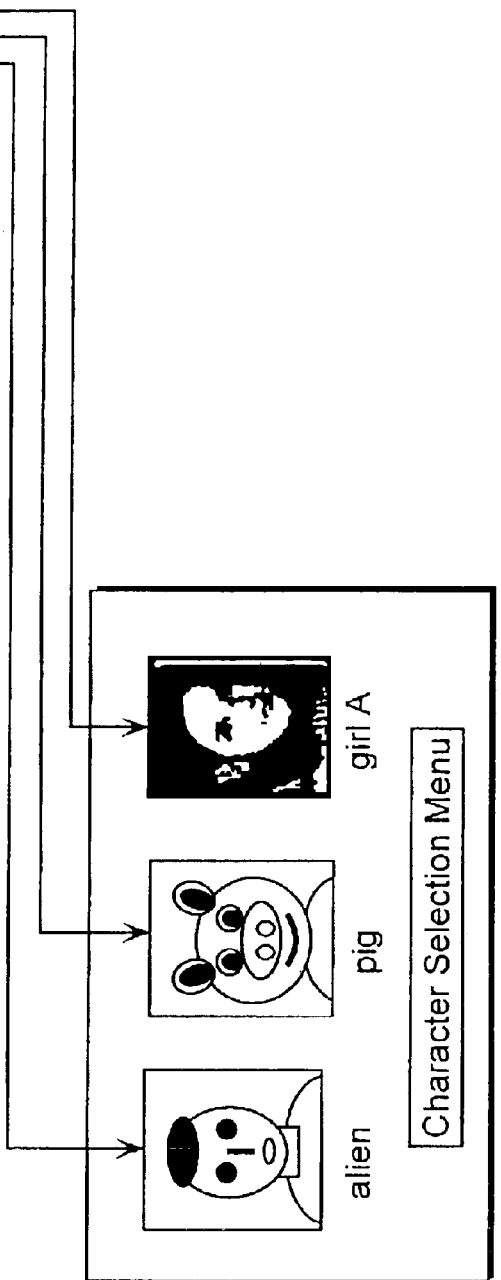

alien  pig  girl A

Character Selection Menu

Communication Partner Management Table

Partner Display Mode

User/Partner Display Mode

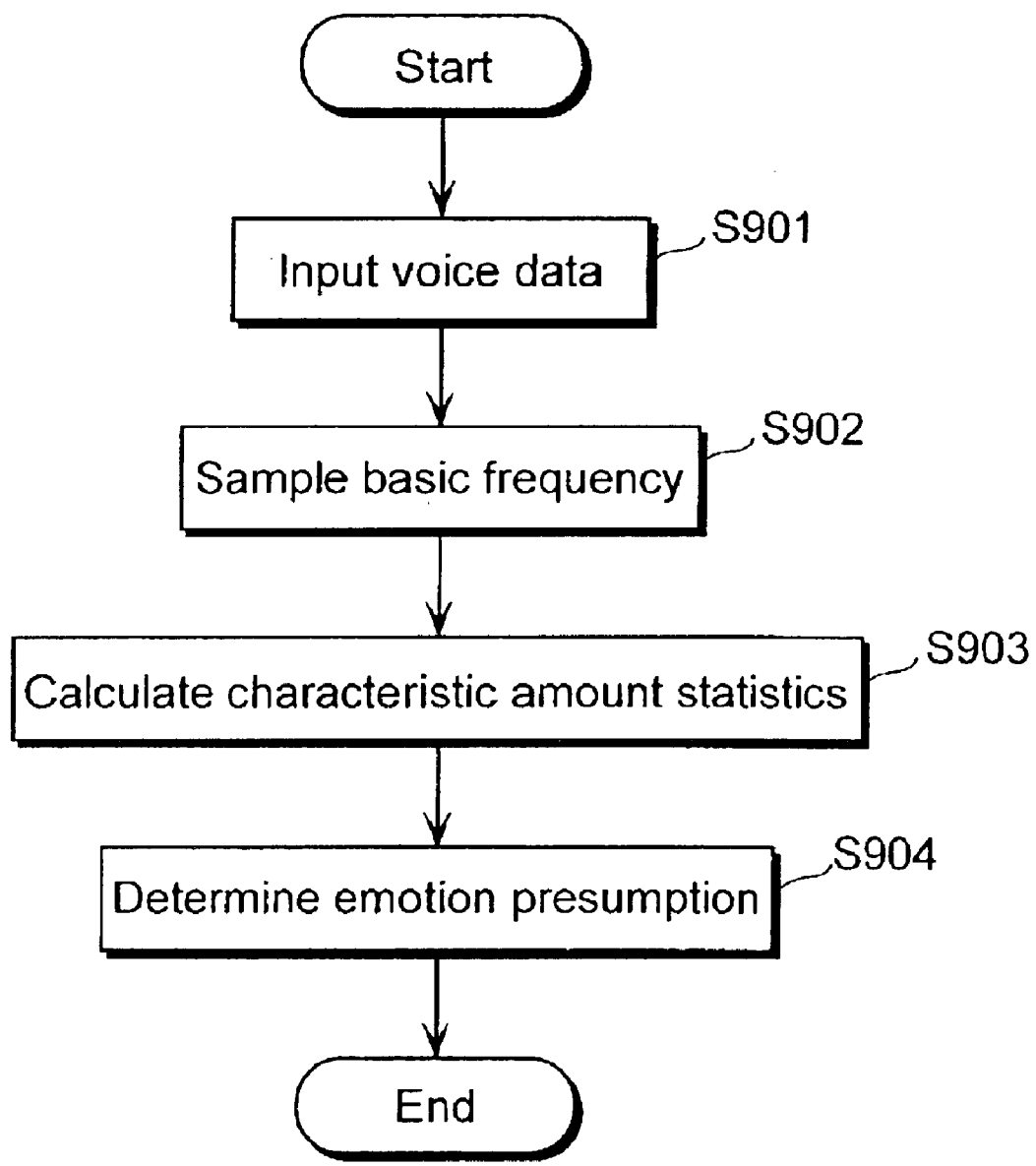

VIRTUAL TELEVISION PHONE APPARATUS

BACKGROUND OF THE INVENTION (1) Field of the Invention

The present invention relates to virtual television phone communication using a communication terminal apparatus with a display device intended for a user to enjoy voice conversation in a visual environment through a virtual three-dimensional CG (computer graphics) character.

(2) Description of the Related Art

Conventionally, what is called a television phone apparatus is an apparatus for having a conversation with a partner over a telephone device with a camera and a display device while seeing the face image of the partner shot by the camera. In order to reduce the transmission amount of data, the face image data is generally compressed, multiplexed with the voice data and sent to a receiver. At the receiver's end, the multiplexed data is divided into the voice data and the compressed image data, the image data is decompressed, and then the voice is outputted and the image is displayed in synchronization with each other. Recently a cell phone which is called Videophone for a next-generation mobile communication (IMT-2000) has been developed based on the MPEG-4 (Moving Picture Experts Group Phase 4) image compression standard (See "NIKKEI ELECTRONICS" 1999. 11. 1 (No. 756), pp 99–117).

In order to send the multiplexed image as mentioned above, a communication standard for a wide band beyond the framework of the conventional voice communication and an infrastructure for realizing such a wide band communication are required. Therefore, there is an invention which is designed to artificially realize a function similar to a television phone via voice data communication only (See Japanese Laid-Open Patent Application No. S62-274962), not by an image compression method as above. According to this invention, the telephone holds in advance a static image of a partner's face which is processed into a face without a mouth as well as static images of mouths which are processed into shapes of pronouncing vowel sounds such as "a", "i" and "u" in Japanese, for instance. The vowels included in the voice data sent from the partner are analyzed using a voice recognition technology, the mouth shape data based on the analysis result is merged into the face image and displayed whenever necessary so as to display the appearance of the partner who is talking. The advantage of this invention is that it can realize artificial television phone communication in the framework of the ordinary voice communication. However, there is a doubt as to whether the user feels nothing unnatural about an image which shows no movement but a mouth or the user can feel like talking with the partner himself.

Beyond the framework of the voice communication, there is another invention which adopts an image recognition technology in order to reduce the data amount rather than sending the image itself (See Japanese Laid-Open Patent Application No. H05-153581). According to this invention, facial expressions and mouth shapes are recognized using the image recognition technology, transformed into parameters and sent together with the voice data. The receiver, which holds the partner's three-dimensional model in advance, transforms the three-dimensional model based on the received parameters and displays it during the output of the voice.

The above-mentioned three inventions are all intended for having a conversation with a partner while seeing his face, not for enjoying the conversation itself more.

These inventions relate to a so-called telephone technology. The popularization of the Internet enables us to have a conversation via a personal computer, though it is mainly a text-based conversation. Under the circumstances, there is an invention in which a user has a CG character who represents himself participate in a common virtual space to enjoy a conversation with a character who represents another participant in that space (See U.S. Pat. No. 5,880, 731). The object of this invention is to have a conversation with a partner anonymously and the user participates in the conversation independent of his real self, so he is able to enjoy imaginary conversations which include fictional characters. The CG character which represents the user is called an avatar because it acts for the user participant who selects the character. The participant himself selects this avatar, and his conversation partner cannot change the character of the avatar. Also, since this avatar is just something for the other participants to identify the partner, it does not need to be changed. In view of realization of this invention, a server computer is required for managing the common virtual space for the participants and controlling their states, in addition to the terminal computers of the participants (client computers).

A technology for having a conversation with a virtual CG character is made open by Extempo Systems Inc. on their Web page of the Internet, for instance. This relates to a text-based conversation with expert characters on the Internet, not a voice conversation.

In the technical aspect, this invention is designed to establish a conversation between a CG character and a person by creating a conversation dictionary classified into keywords in advance, analyzing the matching between the partner's conversation contents and the classified keywords and displaying the most matching conversation sentence. The conversation is established as such even with an ambiguous sentence because of the high human ability of understanding the conversation, but the repeated display of the same sentence is gradually increased during the conversation because the number of the registered conversation sentences is limited. This invention provides new entertainment of having a conversation with a virtual CG character, but such a conversation is quite different from the conversation with a real human in view of flexibility, diversity, appropriateness and individuality. The goal of this technology is how to get close to real human conversation ability.

The characteristics of the above conventional related arts are as follows. The first three are invented upon a request of having a conversation while seeing the partner's face, and the object thereof is to have a conversation while confirming the partner's expression and appearance. Therefore, they are not designed to enjoy the conversation more by putting some processing on the displayed image and the voice through some kind of the receiver's own action, and the technology for that purpose is not disclosed.

The fourth prior art is designed to have a CG character selected by a user participate in a virtual community space anonymously and enjoy a direct and frank conversation or an imaginary and fictitious conversation by this reason of anonymity. Therefore, the CG character of the conversation partner is something just for identifying the partner, not for enjoying the more entertaining conversation by making the CG character and its voice do some kind of action. The fifth prior art has an aspect of enjoying the conversation with a virtual CG character having an artificially intelligent conversation function, but such a conversation is quite different from the conversation with a real human in flexibility, appropriateness and individuality.

SUMMARY OF THE INVENTION

In order to solve the aforesaid problems, it is an object of the present invention to provide a communication terminal with a display function that displays a communication partner as a virtual three-dimensional CG character selected by a communication receiver and enables the receiver to have a voice conversation with the virtual three-dimensional CG character using the conversation with the partner. According to the present invention, a new communication terminal can be realized with more amusing voice conversation in another approach than the functions of "seeing a communication partner's face or seeing a visual image similar to the partner's face" and "acting as a virtual character."

It is another object of the present invention to provide a telephone apparatus with a display device that realizes a conversation in a virtual space without a device like a server used for the above-mentioned related arts.

It is still another object of the present invention is to provide a new telephone apparatus in which a 3-D CG character expresses emotions in accordance with telephone conversation.

In order to achieve above-mentioned objects, the virtual television phone apparatus according to the present invention includes a communication unit operable to carry out voice communication; a character selecting unit operable to select CG character shape data for at least one of a user and a communication partner; a voice input unit operable to acquire voice of the user; a voice output unit operable to output voice of the communication partner; a voice analyzing unit operable to analyze voice data of the communication partner received by the communication unit or both of the voice data of the communication partner and voice data of the user; an emotion presuming unit operable to presume an emotion state of the communication partner or emotion states of both of the communication partner and the user using a result of the voice analysis by the voice analyzing unit; a motion control unit operable to control a motion of the CG character based on the presumption by the emotion presuming unit; an image generating unit operable to generate an image using the CG character shape data and motion data generated based on control information generated by the motion control unit; and a displaying unit operable to display the image generated by the image generating unit.

Also, in the virtual television phone apparatus according to the present invention, the emotion presuming unit notifies the motion control unit of a result of the presumption by the emotion presuming unit, and the motion control unit generates the motion data based on the notice.

The present invention can be realized not only as aforementioned virtual television phone apparatus but also a virtual television phone communication method including steps executed by the units included in this virtual television phone apparatus or a virtual television phone system that uses these steps.

Also, the present invention can be realized as a program for having a computer realize aforementioned virtual television phone communication method, and the program can be distributed via a recording medium such as a CD-ROM and a transmission medium such as a communication network.

Japanese Laid-Open Patent Application No. 2001-387424 filed Dec. 20, 2001 is incorporated herein by reference.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 3 is an explanatory diagram of a CG character data management table and a CG character selection screen according to the present invention.

FIG. 9 is a flowchart showing processing procedure of an emotion presumption method using a frequency signal.

DESCRIPTION OF THE PREFERRED EMBODIMENT(S)

(The First Embodiment)

The virtual television phone apparatus according to the first embodiment of the present invention will be explained below with reference to drawings.

Figure 1:
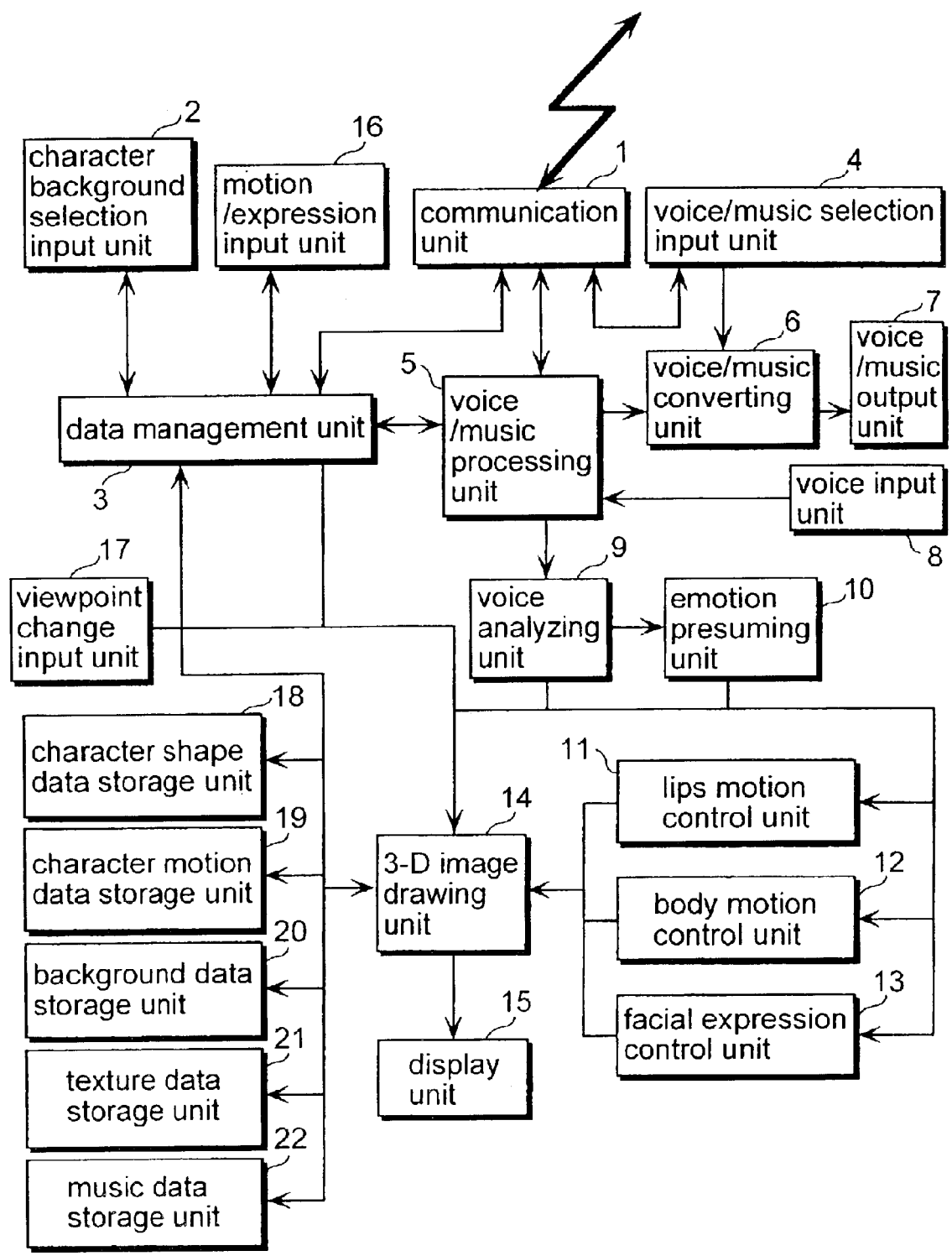
FIG. 1 is a block diagram showing a structure of a virtual television phone apparatus according to the first embodiment of the present invention.

FIG. 1 shows a structure of the virtual television phone apparatus according to the first embodiment of the present invention. The virtual television phone apparatus includes a communication unit 1, a character background selection input unit 2, a data management unit 3, a voice/music selection input unit 4, a voice/music processing unit 5, a voice/music converting unit 6, a voice/music output unit 7, a voice input unit 8, a voice analyzing unit 9, an emotion presuming unit 10, a lips motion control unit 11, a body motion control unit 12, a facial expression control unit 13, a 3-D image drawing unit 14, a display unit 15, a motion/expression input unit 16, a viewpoint change input unit 17, a character shape data storage unit 18, a character motion data storage unit 19, a background data storage unit 20, a texture data storage unit 21 and a music data storage unit 22.

The virtual television phone apparatus according to the first embodiment of the present invention which is structured as above will be explained in detail. The first embodiment of the present invention is divided into two operations: setting operation and incoming/outgoing call operation. Before explaining these operations one by one, the data stored in the devices and the management thereof will be explained as the common subject to these operations.

(Stored Data and Management Thereof)

In the character shape data storage unit 18, shape data of a CG character and the corresponding thumbnail data (image data showing the appearance of the CG character) are stored and managed with their addresses. The character shape data includes body parts such as a head, upper limbs, a trunk, lower limbs, and each part further includes sub parts such as eyes, a nose, a mouth and hairs in the head, hands, front arms, upper arms in the upper limbs, for instance. As for more detailed character shape, the sub parts further includes sub parts such as fingers and palms in the hands, for instance. These hierarchical structure indicates the structure of the character shape, and is generally called a scene graph. Each part and sub part is usually represented by a set of faces obtained by polygon approximation of an object surface called a surface model. They are composed of data in the three-dimensional space such as vertex coordinates, normal vector elements at the vertexes (which are essential for calculation of light source brightness), stroke data obtained by indexing texture coordinates (which are essential for texture mapping) and topological data representing the connection between these data (representing, for instance, a triangle whose vertexes are points 1, 2 and 3 when the vertex indexes are described in the order of 1, 2 and 3), and further includes attribute data such as reflection rates of each surface (diffusion reflection rate and specular reflection rate), environmental light intensity and an object color. When the clothing of the CG character is represented by texture mapping, the address in the texture data storage unit 21 for the texture to be used or the corresponding identifier's ID is indicated in the corresponding part in the shape data of the CG character.

In the character motion data storage unit 19, the motion data of the CG character body and the body motion pattern data that is transition graph data of the body motion, the expression data and the expression pattern data, and the lips motion data and the lips motion pattern data are stored and managed with their addresses.

The body motion data is, as done commonly for CG character animation, time-series data of parallel move distance representing the entire body movement along the route which consists of the representative points of the body in the three-dimensional space, rotation angle along the 3 coordinate axes in the three-dimensional space representing the attitude of the entire body or rotation angle along the vector of the vector element representing the central axis of rotation, and rotation angle along the coordinate axis of the local coordinate system defined by each joint. The CG character shape data is transformed by the transformation system of the local coordinate system at these route positions and joints, the location and the direction of the CG character and the pose of the CG character body at each time are generated and three-dimensional drawing processing is performed thereon. These operations are performed on a continual basis so as to realize the CG animation. When the technology of key frame animation is used, the body motion data of all the frames is not used but the discrete time-series data is used to perform interpolative calculation of the motions during the time period. Therefore, the body motion data is, in this case, the discrete time-series data of the above-mentioned parallel move distance and the angle.

Figure 6A:
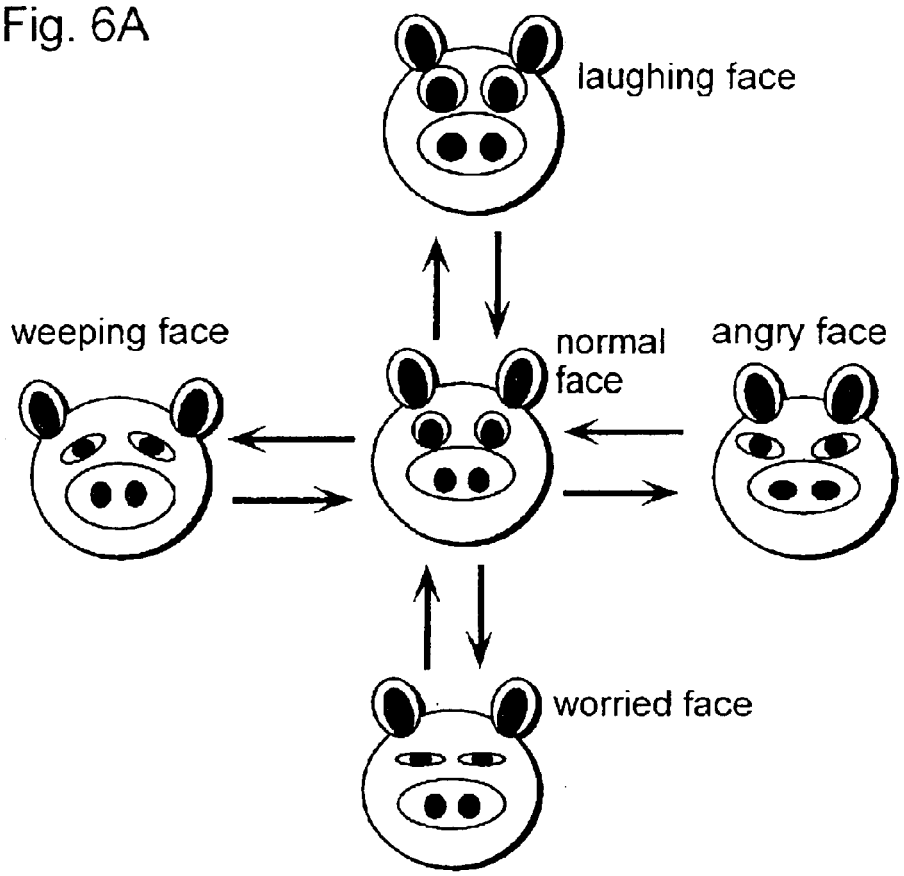
FIG. 6A is an explanatory diagram of transition of expressions according to the present invention.
Figure 6B:
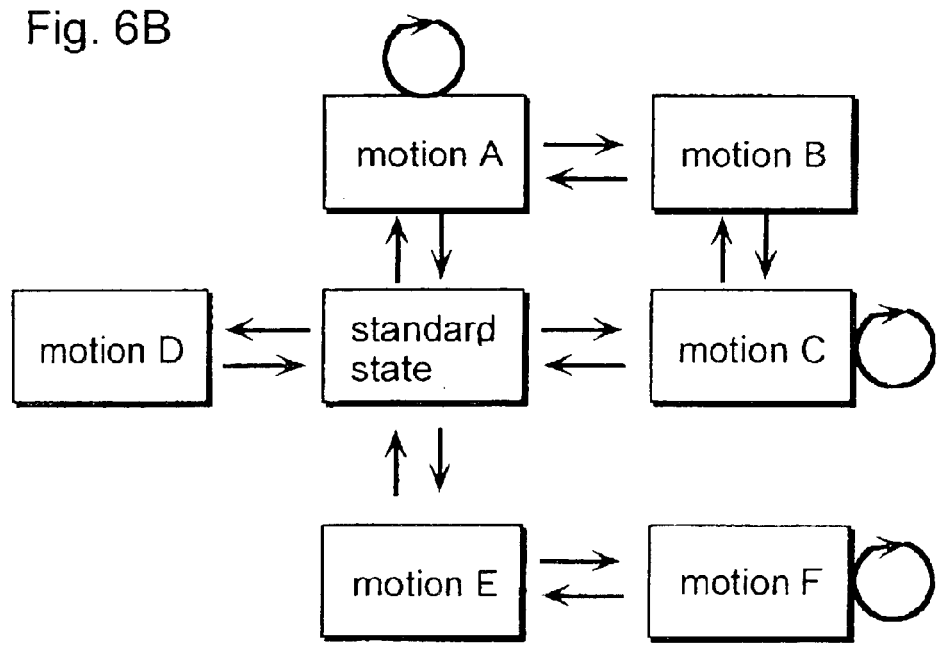
FIG. 6B is an explanatory diagram of transition of body motions according to the present invention.

The body motion pattern data is finite-state graph data, as shown in FIG. 6B, which is composed of the relationship between a motion and another motion to which the motion can make transition from that motion and the entity motion information (motion ID, data type, address and number of frames of each entity body motion and probability of each transition). For example, FIG. 6B shows that the transition from the body motion data representing the normal state to the motion A, motion C, motion D or motion E is possible. When a predetermined event occurs in the normal state, one of the motions A, C, D and E is selected according to the selection processing based on the transition probability described in the entity motion information, and the entity of the motion is acquired with the address. In the present embodiment, the body motion pattern data after starting the conversation will be explained on the assumption that the transition is triggered by an event, that is, the result presumed by the emotion presuming unit 10 such as a normal state, laughing state, weeping state, angry state, worried state and convinced state and the result inputted by the motion/expression input unit 16, but the present invention can be embodied even when the transition is triggered by an event occurred by more complicated presumption result or an another input. Since the body motions depend upon the structure of the shape data (bone structure and hierarchical structure) (for example, a motion of a 6-legged insect cannot be applied to a motion of a 2-legged human being) and all the body motions cannot always be applied to the shape data, the body motions are classified into the applicable data and the inapplicable data based on the data type of the entity motion information. Also, if new body motion pattern data, which is provided at the upper hierarchy of the aforementioned body motion pattern data, manages the addresses of entities of a plurality of body motion pattern data, the above-mentioned body motion pattern data can be incorporated into the higher-level new body motion pattern data. For example, it is very effective if the body motion pattern is switched like the scene change.

The expression data is the data for generating the facial expressions of the CG character, as shown in FIG. 6A. The expressions are generated using a common facial animation technique, such as a method of altering the shape of the face or the texture of the face. When the shape of the face is altered, the time-series data of the move distances of the vertex coordinates corresponding to the endpoints such as an eyebrow, an eye and a mouth for generating expressions among the face shape data is the expression data. These move distances can be calculated in a simulated manner based on a facial muscle model. When the vertexes for transformation extend across a plurality of transformation systems, an envelop method is also used, for giving weight for each transformation on the vertexes, once transforming the weighted vertexes in each transformation system to calculate a plurality of vertexes, and transforming them into a coordinate averaged in consideration of the weighting. In FIG. 6A, each emotion is represented by changing an eye shape, a nose size, an ear shape, a face shape, etc. Also, when the texture is changed, the expression data is the texture of the expression such as laughing and weeping or the texture in the process of changing to such expressions. The expression pattern data is transition graph data of this expression data, as in the case of the transition graph data of the body motion data, and includes a finite-state graph in which a certain expression data can make transition to another expression data and entity expression information (expression ID, data type, address and number of frames of each entity expression data, and probability of each transition). For example, FIG. 6A shows that the normal face cannot be bypassed for the transition to another face, and the expression after the transition is selected based on the transition probability of the entity expression information. Whether it is an expression or a texture and the applicable shape are specified based on the data type of the entity expression information, as in the case of the body motion. For example, 2 or more digit number is assigned as a shape identification number using the first digit of the data type for classification between the expression and the texture. A plurality of expression pattern data can be integrated into one by providing the expression pattern data at the upper hierarchy of the above-mentioned expression pattern data, as in the case of the body motion pattern data.

In the present embodiment, the expression pattern data after starting the conversation will be explained on the assumption that the transition is triggered by an event, that is, the result presumed by the emotion presuming unit 10 such as a normal state, laughing state, weeping state, angry state and worried state or the result inputted by the motion/expression input unit 16, but the present invention can be embodied even when the transition is triggered by an event occurred by more complicated presumption result or another input.

Figure 5A:
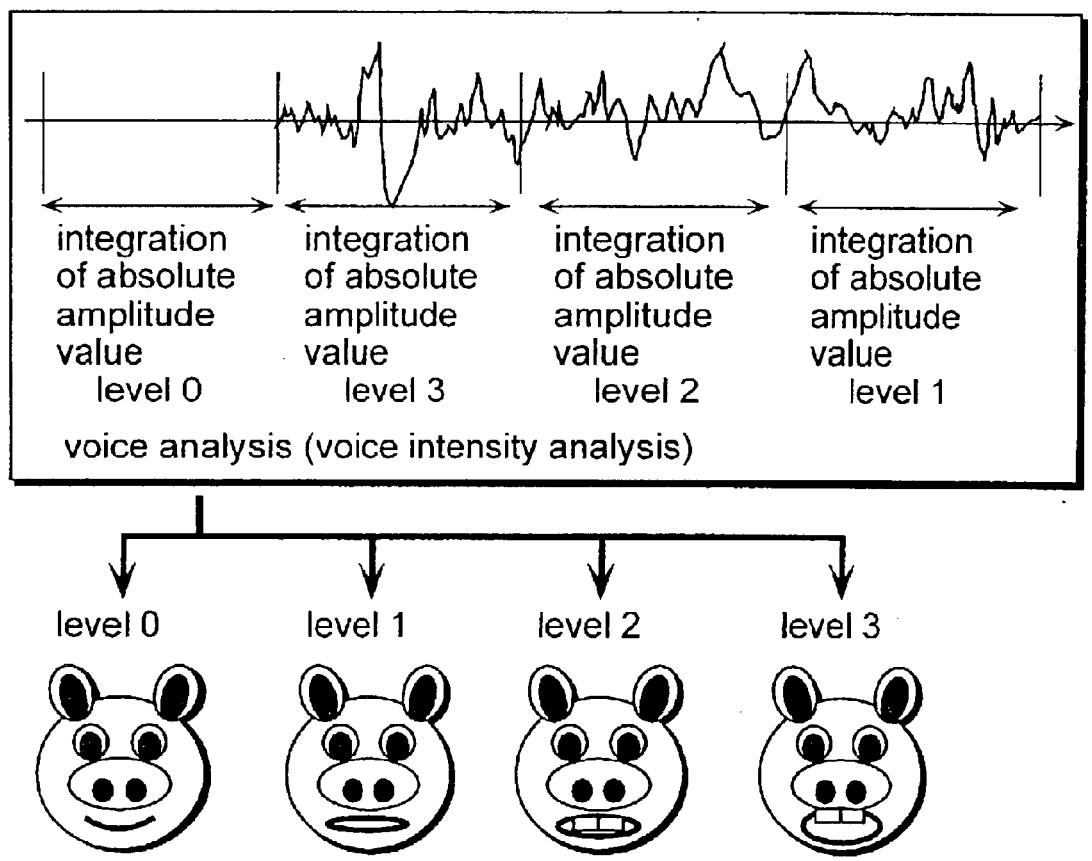
FIG. 5A is an explanatory diagram of a voice intensity analysis and a lips motion operation according to the present invention.
Figure 5B:
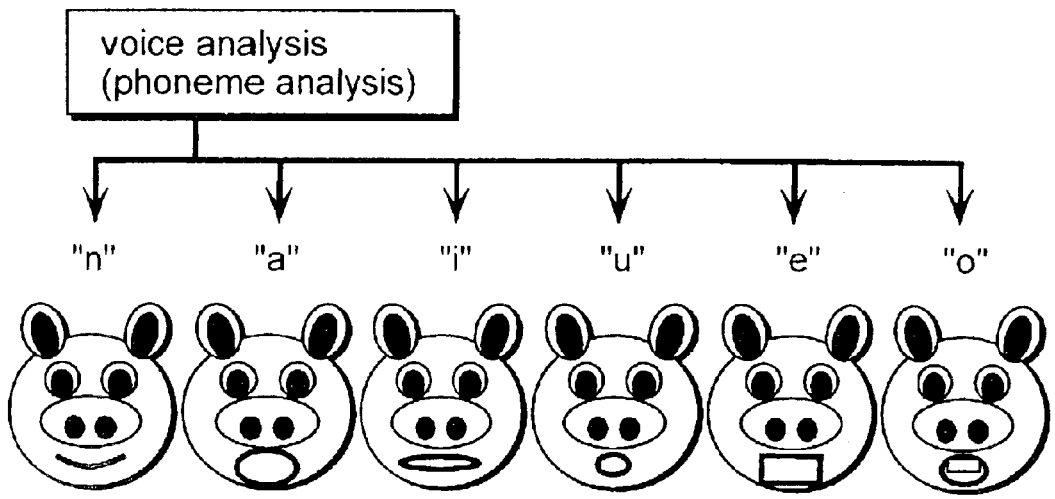
FIG. 5B is an explanatory diagram of a phoneme analysis and a lips motion operation according to the present invention.

As for the lips motion data, a method of changing the mouth shape or the texture is used, as in the case of the expression data and the expression pattern data. The lips motion data depends upon the contents of the voice analysis processing, and when the lips motion is generated based on the voice intensity analysis result which will be described later, the motion data just depending upon the mouth-opening amount is stored (See FIG. 5A). When phoneme can be analyzed, for example, when vowels and the sound (pronunciation) of "n" can be analyzed, the shape change data for generating the lips shape corresponding to that sound and the texture data of the lips are stored as the motion data (See FIG. 5B). The lips pattern data represents a set of several types of the above-mentioned lips motion data, including the entity lips information (each lips ID, data type, address and number of frames of each entity lips motion). Each entity lips ID is an identifier corresponding to the voice intensity level, for instance, under the control based on the voice intensity, as shown in FIG. 5A. These identifiers are assigned with 0, 1, . . . 3 for the levels 0, 1, . . . 3, or 0, and 1, . . . 5 for the sounds "n", "a", . . . "o" under the control based on the phoneme as shown in FIG. 5B. Further, it is possible to combine voice intensity analysis and phoneme analysis. Variations of the sound "a", "a" with high intensity, "a" with low intensity, for instance, can be set. In this case, the lips ID is defined as a two-dimensional identifier, and various levels shown in FIG. 5A of each sound shown in FIG. 5B follow in the vertical direction.

The background data storage unit 20 stores and manages with the addresses the shape data or the images of the background and the corresponding thumbnail images as the background data for displaying the CG character. The shape data of the background is an object that is to be the background as a shape, as in the case of the shape data of the CG character. The image data of the background is the image data of the sky and the distant landscape, for instance, and can be used in a combination of the background object. When the shape data of the background object is patterned by texture mapping, the address of the texture in the texture data storage unit 21 or the ID of the corresponding identifier is indicated.

The texture data storage unit 21 stores and manages with the addresses the image data of the texture of the clothing and others for the CG character and the image data for texture mapping of the background object, which are used when the 3-D image drawing unit 14 performs the texture mapping.

The music data storage unit 22 stores and manages music data with the addresses. The music data is used as a cue by sounding when receiving a call from a partner.

The data management unit 3 manages the stored data, stores and manages the setting data and notifies of the setting data. First, the management of data stored in the character shape data storage unit 18, the character motion data storage unit 19, the background data storage unit 20, the texture data storage unit 21, and the music data storage unit 22 will be explained. FIG. 3 is one of the tables stored in the data management unit 3, a CG character data management table 3a. The CG character data is composed of the name of the CG character, the address of the entity of the CG character shape data in the character shape data storage unit 18, the address of the clothing texture data before changing the clothing texture in the texture data storage unit 21 and the address(es) of the clothing texture data after changing when the texture of the clothing or the like indicated in the CG character shape data is changed based on the user's specification, the two addresses of the expression pattern data stored in the character motion data storage unit 19 before and after the conversation starts, the address of the lips motion pattern, and the address of the thumbnail image stored in the character shape data storage unit 18. The CG character data management table 3a is obtained by organizing these names and addresses into a table with the identifiers of the CG character IDs.

There are other three types of tables, a background data management table, a motion pattern management table and a voice/music management table, that is, there are four types of tables in total including the CG character data management table 3a. The background data management table is obtained by organizing the names of the background objects and the image data of the distant landscape and the addresses thereof in the background data storage unit 20 into a table with the identifiers of the background IDs, the motion pattern management table is obtained by organizing the names of the body motion pattern data and the addresses thereof in the character motion data storage unit 19 into a table with the identifiers of the motion pattern IDs, and the voice/music management table is obtained by organizing the names of the music data and the addresses thereof in the music data storage unit 22 into a table with the identifiers of the music IDs.

(Setting Operation)

Figure 4A:
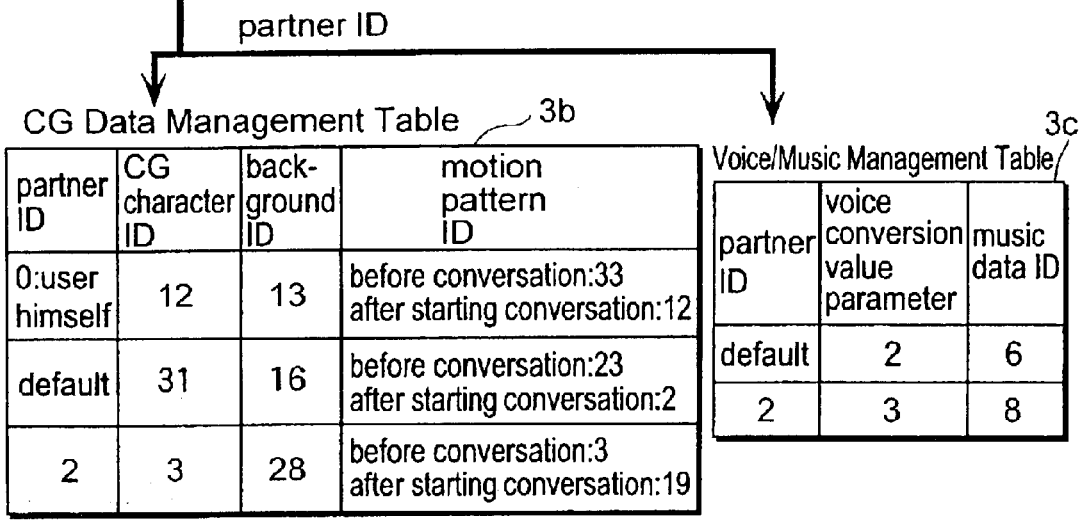
FIG. 4A is an explanatory diagram of a communication partner management table, a CG data management table and a voice/music management table according to the present invention.

The communication unit 1 stores a communication partner management table 1a, as shown in FIG. 4A. The communication partner management table 1a is a table for managing the communication partners with the partners' IDs, telephone Nos., names and display modes. There are three types of display modes; a non-display mode for normal voice communication without display of a CG character, a partner display mode for virtual television phone, and a user/partner display mode for virtual television phone with display of not only the partner but also the user himself. These modes are managed with the identifiers. In the present embodiment, the identifiers 0, 1 and 2 are assigned to the non-display mode, the partner display mode and the user/partner display mode, respectively. Note that the number "0" of the partner ID in a CG data management table is predetermined as indication of the user himself. Since the present embodiment is based on the telephone communication, the following explanation will be made on the assumption that the communication is managed with the telephone numbers. However, it may be managed with the IP addresses based on TCP/IP or the partners' e-mail addresses when the communication is made via the Internet. Since these are the identifiers for specifying the communication partners which are determined depending upon the communication infrastructure, any identifiers which meet these conditions are available.

The CG data management table 3b in FIG. 4A is a table stored in the data management unit 3 for storing and managing the setting of the CG data for the communication partner. It manages the items including the CG character ID in the CG character data management table 3a, the background ID in the background data management table and the body motion pattern ID before and after starting the conversation in the motion pattern management table, which are respectively determined for the communication partner, with the partner ID.

The voice/music management table 3c shown in FIG. 4A is also a table stored in the data management unit 3 for managing the items including the voice conversion value parameter and the music data ID for the ringing melody with the partner ID. The voice conversion value parameter is used in the voice/music converting unit 6, and is an identifier allocated to each band pass filter when the voice is converted by the band pass filter. For example, the identifiers are allocated to the band pass filters in the manner that "0" is allocated to no filter, "1" to the filter of 1 kHz or less, "2" to the filter of 1~5 kHz and "3" to the filter of 5 kHz or more. Since the identifiers are allocated to the parameters required for conversion, the parameters do not depend upon the conversion method (even when the voice is converted according to pitch conversion, for example, it is just required to allocate identifiers to a set of parameters required for conversion). Note that the voice conversion value parameter is an identifier for determining the voice pitch, and has an effect of a voice changer by the user's change of the setting. Also, the music data ID is an identifier for determining a ringing melody.

Figure 4B:
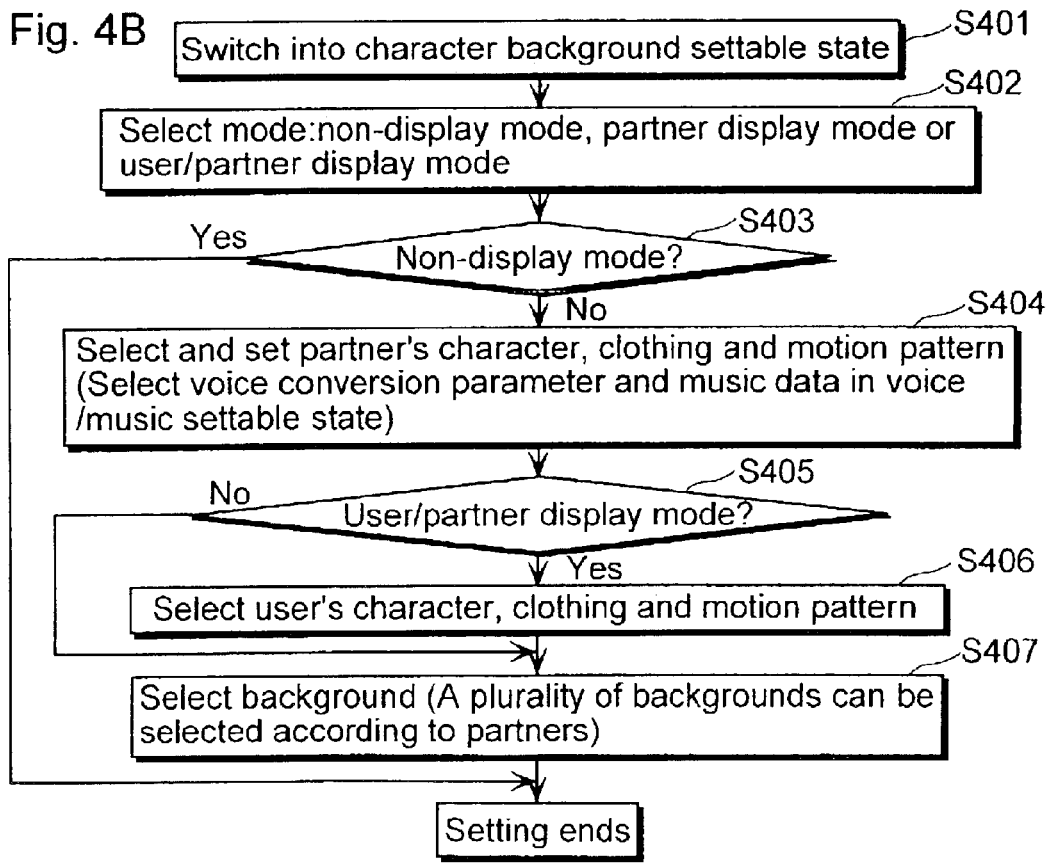
FIG. 4B is a flowchart showing setting operation according to the present invention.

The setting operation will be explained with reference to FIG. 4B. When a user operates the setting state shift input unit in the character background selection input unit 2, the data management unit 3 is notified that the state will shift to the settable state. The data management unit 3 reads out the contents of the communication partner management table 1a stored in the communication unit 1 and sends them to the 3-D image drawing unit 14 (S401). Based on the pre-stored setting screen data, the 3-D image drawing unit 14 generates a setting screen where the contents of the communication partner management table 1a are reflected and displays the setting screen on the display unit 15. The character background selection input unit 2 selects a communication partner (S402), and inputs the display mode according to the aforesaid identifier for the partner. When "0" indicating non-display mode is selected (S403), the setting ends.

Next, when the display mode is "1" for displaying the partner only as a CG character or "2" for displaying both the partner and the user himself as CG characters, the communication unit 1 and the 3-D image drawing unit 14 are notified of the selected display mode through the data management unit 3. The communication unit 1 describes and stores the selected display mode in the communication partner management table 1a. The 3-D image drawing unit 14 generates the CG character selection setting screen, the clothing texture setting screen and the body motion pattern setting screen, which are predetermined as shown in FIG. 3, in sequence, and displays them in the display unit 15. On the character selection screen, the images and the names of the CG characters are drawn as shown in FIG. 3, based on the thumbnail addresses and the CG character names as shown in the CG character data management table 3a. The CG character selection setting screen, the clothing texture setting screen and the body motion pattern setting screen are displayed in sequence. The defaults which are selected and inputted through the character background selection input unit 2, and the result of the CG characters for specific communication partners and the result of the body motion patterns selected on the CG character selection setting screen and the body motion pattern setting screen are recorded in the corresponding fields of the CG data management table 3b stored in the data management unit 3 as the corresponding IDs. The selection on the clothing texture setting screen is recorded in the corresponding fields of the CG character management table 3a stored in the data management unit 3. As for the body motion patterns, two types of patterns before and after starting the conversation can be selected, and the names thereof described in the motion pattern management table can be displayed on the setting screen. This display makes it easier for a user to select the body motion because he can picture the image in his mind. Such body motion patterns include, for instance, a mambo, a waltz, an anchorman's motion and a popular TV personality's motion (S404).

The voice/music selection input unit 4 sets and inputs voice conversion parameters and music data in the same manner. When a user operates the setting state shift input unit predetermined by the voice selecting unit 4, the 3-D image drawing unit 14 is notified of the shift to the input mode through the communication unit 1 and the data management unit 3. The 3-D image drawing unit 14 generates a predetermined setting screen and displays it in the display unit 15. On the displayed setting screen, the user selects and inputs the voice conversion parameters and the music data through the voice/music selection input unit 4. The inputted selection result is recorded in the voice/music management table 3c stored in the data management unit 3 (S404).

When the partner display mode is selected, the step goes to the background selection setting (S405). When the user/partner display mode is selected, the user selects and inputs the CG character, clothing texture and motion pattern for the user himself through the character background selection input unit 2 in the same manner as above (S406), and then the step goes to the background selection.

As for the background selection, a predetermined background setting screen is displayed, and the user selects the background through the character background selection input unit 2 (S407). The selection result is stored in the CG data management table 3b stored in the data management unit 3.

Finally, when the above-mentioned CG character and the body motion pattern are set, the motion/expression input unit 16 is notified of the address of the specified expression data among the expression pattern data and the address of the specified body motion data among the body motion pattern data. The motion/expression input unit 16 holds the notified address of the body motion data and the address of the expression data, and associates them with the input buttons preset in the motion/expression input unit 16. When the user presses the input button, the data management unit 3 is notified of the associated address of the body motion data or expression data. Then, the body motion control unit 12 is notified of the address of the body motion data and the facial expression control unit 13 is notified of the address of the expression data. A plurality of input buttons offers a plurality of addresses of the body motion data and the expression data to be stored. Also, the addresses before and after starting the conversation and the addresses of the expression data are shown explicitly. The button input is described in the present embodiment, but any input unit that can specify the addresses (such as a keyboard and a mouse) may be used. Accordingly, the user can select not only his own character but also the character of his communication partner. Also, the device on the user's end has all the data required for virtual television phone communication, and thereby the user can make virtual television phone communication even if the partner does not use the virtual television phone apparatus.

Note that the graphical setting as mentioned above is generally used in PCs and can be realized by the existing software technology.

(Incoming/Outgoing Call Operation)

When a user inputs a telephone number using the communication unit 1 to make a call, the telephone number is collated with the contents of the telephone number field recorded in the stored communication partner management table 1a to specify the partner ID and the display mode. Since the caller's telephone number is displayed before starting the conversation when receiving a call, the telephone number is collated with the contents of the telephone number field recorded in the communication partner management table 1a to specify the caller's (the partner's) ID and the display mode. It is assumed that the communication unit 1 has an ordinary function for voice communication (so-called baseband processing for a cell phone, and others).

When the non-display mode is specified, the common voice conversation processing is performed. More specifically, when the voice data is sent from the caller after the communication with the caller is accepted, the voice/music processing unit 5 performs the ordinary voice processing such as decoding and sends the voice to the voice/music output unit 6 through the voice/music converting unit 6 to output the voice. When the user inputs his own voice in the voice input unit 8, the voice/music processing unit 5 performs the ordinary voice processing such as compression of the voice data and sends the voice to the communication partner via the communication unit 1.

The operation in the partner display mode where only the partner is displayed as a CG character will be explained below. There are two types of operations before and after starting the conversation, and the communication unit 1 notifies the data management unit 3 of the conversation start.

Since the telephone number of the partner can be specified before the conversation in both sending and receiving a call, the communication unit 1 specifies the partner ID among the communication partner management table 1a and sends the specified ID to the data management unit 3. The data management unit 3 specifies the CG character ID, background ID, two motion pattern IDs (IDs of the body motion patterns before and after the conversation) corresponding to the partner's ID from among the stored CG data management table 3b. When there is no ID corresponding to the partner ID in the CG data management table 3b, the data management unit 3 specifies the default CG character ID, background ID and two motion pattern ID (IDs of the body motion patterns before and after the conversation). The data management unit 3 specifies, based on the specified CG character ID, the address of the CG character shape data, the address of the clothing texture before changing, the address of the clothing texture after changing, the two addresses of the expression pattern data before and after starting the conversation and the address of the lips motion pattern from the CG character data management table 3a. The data management unit 3 specifies, based on the specified background ID, the address of the background data from the stored background data management table. The data management unit 3 further specifies, based on the motion pattern IDs (IDs of the body motion patterns before and after the conversation), the two addresses of the body motion pattern before and after starting the conversation from the stored motion pattern management table.

The data management unit 3 notifies the 3-D image drawing unit 14 of the specified address of the CG character shape data, addresses of the clothing texture before and after changing and address of the background data. Based on the specified addresses of the two body motion pattern data before and after starting the conversation, the addresses of the two expression pattern data before and after starting the conversation and the address of the lips motion pattern data, the data management unit 3 also reads out, from the character motion data storage unit 19, the two body motion pattern data before and after starting the conversation, the two expression pattern data before and after starting the conversation and the lips motion pattern data, and sends them to the body control unit 12, the facial expression control unit 13 and the lips motion control unit 11, respectively.

The lips motion control unit 11 selects the address of the appropriate lips motion data from among the lips motion pattern data and notifies the 3-D image drawing unit 14 of the address and all the frames in sequence from the frame No. 0. The address of the appropriate lips motion data may be selected from among the lips motion pattern data using random numbers, equal probability or by weighting the lips motions. This processing is repeated until the conversation starts. Fixed transition may be predefined without using random numbers to notify the 3-D image drawing unit 14 of the address of the lips motion data and the frame number according to the sequence of the transition. In this case, a user sees the regular lips motions repeatedly. For example, the lips motion in synchronism with the word "Telephone!" can be displayed repeatedly.

The body motion control unit 12 first notifies the 3-D image drawing unit 14 of the address of the body motion data corresponding to the normal state and all the frames in sequence from the frame No. 0 from the body motion pattern data before starting the conversation, as shown in FIG. 6B. After notifying all the frames, it generates a random number based on each transition probability to select the next body motion data, and notifies the 3-D image drawing unit 14 of the address of the body motion data after the transition and all the frames from No. 0. After completing the notice, it generates a random number based on each transition probability to make the transition. The body motion control unit 12 repeats this processing until the conversation starts. Fixed transition may be predefined for the body motion pattern without using a random number to notify the 3-D image drawing unit 14 of the address of the body motion data and the frame number according to the sequence of the transition. In this case, a user sees the regular body motions repeatedly. For example, the body motion such as "picking up a handset of a telephone" can be displayed repeatedly.

The facial expression control unit 13 first notifies the 3-D image drawing unit 14 of the address of the expression data corresponding to the normal face and all the frames in sequence from the frame No. 0 from among the expression pattern data before starting the conversation, as shown in FIG. 6A. After notifying all the frames, it generates a random number based on each transition probability to select the next expression data, and notifies the 3-D image drawing unit 14 of the address of the expression data after the transition and all the frames from No. 0. After completing the notice, it again generates a random number based on each transition probability to make the transition. The facial expression control unit 13 repeats this processing until the conversation starts. Fixed transition may be predefined for the expression pattern without using a random number to notify the 3-D image drawing unit 14 of the address of the expression data and the frame number according to the sequence of the transition. In this case, a user sees the regular expression repeatedly. For example, the expression such as "a normal face and a worried face" can be displayed repeatedly.

The basic 3-D image drawing operation in the 3-D image drawing unit 14 will be explained. The 3-D image drawing unit 14, based on the address of the CG character shape data, the addresses of the clothing texture before and after changing and the address of the background data, which are notified from the data management unit 3, loads the shape data of the CG character to be drawn from the character shape data storage unit 18, the clothing texture data from the texture data storage unit 21, and the background data from the background data storage unit 20, respectively. Next, the 3-D image drawing unit 14 receives the address and the frame number of the lips motion data notified from the lips motion control unit 11, the address and the frame number of the body motion data notified from the body motion control unit 12 and the address and the frame number of the expression data notified from the facial expression control unit 13. Based on the received addresses of the lips motion data, the body motion data and the expression data, it loads the lips motion data, the body motion data and the expression data from the character motion data storage unit 19. The 3-D image drawing unit 14 loads these data only once at the beginning of the notice unless the address of each motion notified from the lips motion control unit 11, the body motion control unit 12 and the facial expression control unit 13 are not updated. Since the character corresponding to the specific communication partner is displayed when a call is received, a user can easily find who makes the call only if he sees the character displayed on the screen.

The motion data of the frame number notified from the lips motion control unit 11 is generated from the loaded lips motion data. When the lips shape is changed, the lips motion data is generated by interpolation of the key motion data in the same manner as the common key frame animation technology, and in the case of texture, the lips motion is also generated by interpolation of the key texture. In the case of shape change, the mouth shape of the CG character shape data is changed using the motion data of the generated frame number. In the case of texture, mapping is performed on the mouth using the common texture mapping technology. This mapping is performed for 3-D image drawing processing.

As for the expression data, the motion data of the notified frame number is generated, and the face shape is changed based on that motion data in the case of shape change, in the same manner. In the case of texture, the face is drawn by texture mapping. This texture mapping is performed for the 3-D image drawing processing. Also, the motion data of the body motion data of the notified frame number is generated by interpolation of the key body motion data, and the above-mentioned conversion is performed on the CG character based on that body motion data to determine the position and the body state of the CG character.

Then, when the background data, the clothing texture data and the lips motion data are textures, and when the expression data is a texture, respectively, an image is generated by the common 3-D image drawing processing (the 3-D image drawing processing is performed in the order of modeling transformation, visibility transformation, perspective transformation, screen transformation and pixel processing on the screen, but the texture mapping is performed when the pixel processing is performed on the screen) using the textures thereof. For that processing, the default camera data (the location, direction and viewing angle of the camera which are necessary for the visibility transformation and the screen transformation) is first used. For example, the image is set so that the CG character faces the front and the body is placed in the center of the image. In order to set the image as above, the minimum rectangular solid including the CG character is obtained and the angle of view is set so that the center of gravity of the solid is on the optical axis in the direction opposite to the direction corresponding to the front of the route direction vector of the CG character and each vertex is included in the screen.

If the viewpoint change input unit 17 inputs the camera data, notifies the 3-D image drawing unit 14 of it and performs the 3-D image drawing processing based on this camera data, the image seen from another viewpoint can be generated. Also, the camera data which is preset in the viewpoint change input unit 17 is notified the 3-D image drawing unit 14 so as to change the viewpoint.

When a user presses the above-mentioned preset input button, the motion/expression input unit 16 notifies the body motion control unit 12 and the facial expression control unit 13 of the address of the body motion data and the address of the expression data, respectively, via the data management unit 3. When receiving the address of the body motion data, the body motion control unit 12 usually selects the next body motion data as described above after notifying the 3-D image drawing unit 14 of the last frame number of the current body motion data, and notifies the 3-D image drawing unit 14 of the address and the frame number of the body motion data which was forcibly notified from the data management unit 3. Similarly, after notifying the current expression data, the facial expression control unit 13 notifies the 3-D image drawing unit 14 of the address and the frame number of the expression data which was forcibly notified from the data management unit 3. As a result, the body motion data and the expression data are normally automatically selected to be animation, but the user can display his own selected motion forcibly.

The image which is generated and 3-D-drawing processed as described above is transferred to the display unit 15 and displayed.

The 3-D image drawing unit 14 usually performs the 3-D image drawing processing at the refresh rate of the display unit 15. The addresses and the frame numbers of the motions are notified from the lips motion control unit 11, the body motion control unit 12 and the facial expression control unit 13 during the 3-D image drawing processing, and set as the data which is used next. When performing the 3-D image drawing processing for the next frame, this address and the frame number of each motion data are used. The notices from the lips motion control unit 11, the body motion control unit 12 and the facial expression control unit 13 are controlled synchronously.

The music data will be explained below. The data management unit 3 specifies the value of the voice conversion value parameter and the music data ID corresponding to the partner ID according to the voice/music management table 3c. When there is no value or ID corresponding to the partner ID in the voice/music management table 3c, the data management unit 3 specifies the default voice conversion value parameter and the music data ID. It acquires the address of the music data from the music data management table based on the music data ID. It loads the music data from the music data storage unit 22 based on the acquired address of the music data and transfers it to the voice/music processing unit 5. The voice/music processing unit 5 decompresses the music data if it is compressed, and performs sound generation processing from the stored sound source data when the music data is encoded such as MIDI data, and then outputs the music from the voice/music output unit 7 via the voice/music converting unit 6. When receiving a call, a ringing melody associated with the character of the communication partner is output from the voice/music output unit 7 so as to easily identify who is calling.

The above-mentioned operation makes it possible to display the CG character during the music being put on, but the music and the motion of the CG character do not basically synchronize with each other (since they can be synchronized with each other if the motion data is created so as to be synchronized with the music data in advance, the initial output of them can at least be synchronized). Explanation about synchronization of music and a CG character will follow. The data including time management data which corresponds to a time stamp used for image data is used for the music data here. Audio according to MPEG-4 (Moving Picture Experts Group Phase 4) includes time stamps, and as for MIDI data, delta time which is obtained by integrating time increment data can be substituted for the time stamp. When transferring the music data to the voice/music output unit 7, the voice/music processing unit 5 manages the time stamps, and sends the music data, using the time stamp for the output of the next music as a time synchronous signal, to the lips motion control unit 11, the body motion control unit 12 and the facial expression control unit 13. The lips motion data, the expression data and the body motion data including the time stamps which start at 0 are used. The time stamps are allocated in accordance with the music in advance. The lips motion control unit 11, the body motion control unit 12 and the facial expression control unit 13 collate these sent time stamps with the time stamp numbers of the motion data under their control, using the fact that the sum of the cumulative number of time stamps of the motion data which have been used for the 3-D image drawing and the number of time stamps included in each motion corresponds to the time stamps of the music. The frame number and the address of the motion data which match with the music data as a result of the collation are sent to the 3-D image drawing unit 14 at the same time. As a result, the motion can be controlled in synchronization with the music data.

Next, the operation after starting the conversation will be explained. The communication unit 1 determines that the communication has started with the partner. As for the normal telephone communication, it is acknowledged that the communication has been established when the partner sends an acceptance signal by lifting the handset if a user himself makes a call, and when the user sends an acceptance signal by lifting the handset if the partner makes a call. It can be acknowledged that the communication has started even in wireless communication such as a cell phone or communication such as the Internet according to the basically same mechanism. The communication unit 1 notifies the data management unit 3 that the communication has been established.

When receiving the notice that the communication has been established, the data management unit 3 stops transferring the music data to the voice/music processing unit 5 and notifies it of the communication start. The data management unit 3 further reads out the voice conversion value parameter from the voice/music management table 3c and notifies the voice/music converting unit 6 of it via the voice/music processing unit 5. At the same time, it notifies the lips motion control unit 11, the body motion control unit 12 and the facial expression control unit 13 that the conversation will start.

When receiving the notice, the lips motion control unit 11, the body motion control unit 12 and the facial expression control unit 13 stop transferring to the 3-D image drawing unit 14. The lips motion control unit 11 sends to the 3-D image drawing unit 14 the address and the frame number of the lips motion data in the level 0 state shown in FIG. 5A when the voice analyzing unit 9 analyzes the voice intensity only, and the address and the frame number of the lips motion data in the state of pronouncing "n" shown in FIG. 5B when the voice analyzing unit 9 analyzes the phoneme only or analyzes both the voice intensity and the phoneme. The body motion control unit 12 sends to the 3-D image drawing unit 14 the address and the frame number of the body motion data in the normal state of the body motion pattern data after starting the conversation. The facial expression control unit 13 sends to the 3-D image drawing unit 14 the address and the frame number of the expression data in the normal face of the expression pattern data after starting the conversation. When receiving the addresses and the frame numbers of the motion data sent from the lips motion control unit 11, the body motion control unit 12 and the facial expression control unit 13, the 3-D image drawing unit 14 performs the 3-D drawing processing in the same manner as mentioned above, and sends the generated image to the display unit 15 to display it.

When receiving the notice of the conversation start, the voice/music processing unit 5 performs the voice processing (such as decoding the voice data and canceling noise) in accordance with a communication medium sent from the communication unit 1, and sends the processed data to the voice/music converting unit 6 and the voice analyzing unit 9.

The voice/music converting unit 5 converts the voice based on the sent voice or the value parameter (for instance, performs filtering in the case of the above filtering processing), and sends it to the voice/music output unit 7. Therefore, the voice of the person who talks over the telephone is converted into another voice and outputted.

The voice analyzing unit 9 analyzes the intensity or the phoneme, or both of the sent voice data. The voice intensity is analyzed in the manner that the absolute value of the voice data amplitude for a predetermined time period (such as a display rate time) is integrated (the sampling values are added) is integrated as shown in FIG. 5A and the level of the integrated value is determined based upon a predetermined value for that period. The phoneme is analyzed in the manner that the processing for the normal voice recognition is performed and the phonemes are classified into "n", "a", "i", "u", "e" or "o", or the ratio of each phoneme is outputted. Basically, a template obtained by normalizing the voice data of the phonemes "n", "a", "i", "u", "e" or "o" which are statistically collected is matched with the input voice data which is resolved into phonemes and normalized, the most matching data is selected, or the ratio of matching level is outputted. As for the matching level, the data with the minimum distance measured by an appropriately pre-defined distance function (such as Euclid distance, Hilbert distance and Maharanobis distance) is selected, or the value is calculated as the ratio by dividing each distance by the total of the measured distances of all the phonemes "n", "a", ""i", "u", "e" and "o". These voice analysis result is sent to the emotion presuming unit 10. Also, the lips ID is determined as above based on the voice analysis result, and the determined lips ID is sent to the lips motion control unit 11.

The lips motion control unit 11 determines the address of the lips motion data corresponding to the lips motion pattern data based on the lips ID sent from the voice analyzing unit 9, and sends the address and the frame number of the lips motion data to the 3-D image drawing unit 14.

The emotion presuming unit 10 stores the voice analysis result sent from the voice analyzing unit 9 for a predetermined time period in advance, and presumes the emotion state of the person who talks over the telephone based on the stored result. For example, the emotion types are classified into "normal", "laughing", "angry", "weeping" and "worried". As for the voice intensity level, the emotion presuming unit 10 holds the level patterns for a certain time period as templates for each emotion. Assuming that the certain time period corresponds to 3 times of voice analyses, the templates show that "level 2, level 2, level 2" is "normal", "level 3, level 2, level 3" is "laughing", "level 3, level 3, level 3" is "angry", "level 1, level 2, level 1" is "weeping" and "level 0, level 1, level 0" is "worried". For the stored 3-time analysis result against these templates, the sum of the absolute values of the level differences (Hilbert distance) or the sum of the squares of the level differences (Euclid distance) is calculated so that the most approximate one is determined to be the emotion state at that time. Or, the emotion state is calculated with a ratio obtained by dividing the distance for each emotion by the sum of the distances for all the emotions. When the phoneme analysis result is sent, the emotion state is obtained by template matching with a keyword as a dictionary template. However, since only the vowels are analyzed in the present embodiment, the following method is used. For the angry emotion, the words indicating anger such as "ikatteiru (being angry)", "ikidori (indignation)" and "naguru (beat)" are represented in vowels such as "iaeiu", "iioi" and "auu", and a dictionary is created using the first 3 characters of them when the certain time period is the period for 3-time voice analysis result. In the same manner, dictionaries are created for other emotion states. There is, of course, another word having the same vowel representation in these dictionaries. More frequently-used word is included in the dictionary based on the analysis of the daily conversation to generate the dictionary template in advance. Since there are 216 combinations of vowels when the certain time period is that for 3-time analyses, 216 words are classified into respective emotion states in this dictionary template. Template matching is performed between the stored 3-time phoneme analysis result and the dictionary template to determine the emotion state. For the combination of the voice intensity analysis and the phoneme analysis, when the same emotion state is determined in both analyses, that emotion state is determined to be the current emotion state. When the different emotion states are determined, one of the emotion states is selected at random to be the current emotion state. The emotion state calculated as above is sent to the body motion control unit 12 and the facial expression control unit 13.

On the other hand, the user's conversation is inputted into the voice input unit 8 as the voice data, and then sent to the voice/music processing unit 5. A microphone is used as the voice input unit 8. The voice/music processing unit 5 performs processing of canceling noises and eliminating echoes which are normally performed for the input voice data, and sends the processed voice data to the voice analyzing unit 9. The processed voice data is performed the processing depending upon the communication method, such as encoding and transforming into streams or packets, and then sent to the communication partner via the communication unit 1. The voice analyzing unit 9 also analyzes the intensity and the phonemes of the input voice data as mentioned above, and sends it to the emotion presuming unit 10 along with the analysis result of the input voice and the identifier indicating that input voice. The emotion presuming unit 10 stores the voice analysis result in a storage area exclusively for the input voice for a certain time period as mentioned above, and performs the emotion presumption processing of the stored result in the same manner as above. The state peculiar to the hearer such as "convinced state" is added to that emotion presumption. In other words, the emotion presumption method may be different between the voice data of the partner and the voice data of the user himself. The emotion presumption result is sent to the body motion control unit 12 and the facial expression control unit 13.

There is another emotion presumption method using a frequency signal of the voice data such as a prosodic phoneme, an amplitude and a stress. FIG. 9 is a flowchart showing processing procedure of the emotion presumption method using a frequency signal. The following explanation of this emotion presumption method is based on the assumption that 4 types of the most basic emotions, "anger", "sorrow", "delight" and "standard" are presumed.

First, the voice of the user himself is inputted into the voice input unit 8 as the voice data and sent to the voice/music processing unit 5. The voice of the partner is inputted into the voice input unit 5 via the communication unit 1 (S901). The voice/music processing unit 5 performs the normal processing on the sent voice data such as canceling noises and eliminating echoes, and sends the processed voice data to the voice analyzing unit 9.

The voice analyzing unit 9 fetches the characteristic amount by the processing using a frequency signal of the voice data such as a prosodic phoneme, an amplitude and a stress. This characteristic amount is based on the basic frequency where the difference between each emotion is well reflected, and "Fomax" (the maximum value [Hz] of the basic frequency (FO) during the speech), "Amax" (the maximum value [Hz] of the amplitude during the speech), "T" (the time length [sec] from the start through the end of the speech), "FOinit" (the basic frequency [Hz] just after the start of the speech), "FOrange" (the maximum basic frequency—the minimum basic frequency [Hz] during the speech) and so on are used. Also, another parameter such as sex difference compensation can be added to the characteristic amount.

The voice analyzing unit 9 samples the basic frequency using DP matching method in consideration of a context of the whole speech. This sampling method will be briefly explained. The voice data inputted into the voice input unit 8 is once converted into data in the frequency domain by the voice analyzing unit 9, and again converted into data in the time domain by predetermined processing. A predetermined number of data is selected in the order of the larger peak values from the data in the time domain and the peaks of the selected data are connected so that the basic frequency is sampled (S902).

Next, the emotion presuming unit 10 calculates the statistics based on the characteristic amount fetched by the voice analyzing unit 9 (S903) so as to presume which emotion group each voice data belongs to (S904). This emotion presumption method makes it possible to presume the emotion of the speaker at a high probability. Then, the emotion presuming unit 10 sends the emotion presumption result to the lips motion control unit 11, the body motion control unit 12 and the facial expression control unit 13.

Accordingly, the character displayed on the screen of the virtual television phone apparatus moves on the presumption of the user's and the partner's emotions, so more entertaining virtual television phone apparatus can be realized.

The body motion control unit 12 determines (predetermines) the body motion data corresponding to the sent emotion presumption result to be the next motion transition, and sends the address and the frame number of the determined body motion data to the 3-D image drawing unit 14 after completing sending the address and the frame number of the current body motion data for all the frames. When it controls the determination of the transition of the body motion data at random, it predetermines a probability of causing or not causing the transition corresponding to the emotion presumption result (when one probability is determined, another probability is inevitably determined due to binary distribution), and determines the transition using random numbers according to that distribution. The facial expression control unit 13 also determines the transition in the same manner, and sends the address and the frame number of the expression data to the 3-D image drawing unit 14.

The 3-D image drawing unit 14 generates an image in the same processing as that performed before starting the communication, using the address and the frame number of the lips motion data sent from the lips motion control unit 11, the address and the frame number of the body motion data sent from the body motion control unit 12 and the address and the frame number of the expression control data sent from the facial expression control unit 13, and sends the image to the display unit 15. The display unit 15 displays that image.

When the motion/expression input unit 16 or the viewpoint change input unit 17 inputs data, the motion or the expression corresponding to that input is reflected to the CG character or the viewpoint is changed, as in the case before starting the communication.

The basic operation of the user/partner display mode is same as the operation mentioned above, but different in that the data for the user himself needs to be added. The data for the user is added to the data notified from the data management unit 3 before and after starting the communication. The lips motion control unit 11, the body motion control unit 12 and the facial expression control unit 13 send to the 3-D image drawing unit 14 the address and the frame number of the motion data of the user's CG character as well as the identifiers indicating the user and the partner. The 3-D image drawing unit 14 determines based on the identifiers the body state, expression and lips state of the partner's CG character and the body state, expression and lips state of the user's CG character, generates the images by the same processing mentioned above, and sends the generated images to the display unit 15 to display them. The voice/music processing unit 5 sends the voice data to the voice analyzing unit 9 together with the identifier of the user or the partner. The voice analyzing unit 9 performs the same processing as mentioned above, and sends the voice analysis result together with the identifier of the user or the partner to the lips motion control unit 11 and the emotion presuming unit 10. The lips motion control unit 11 determines the address and the frame number of the lips motion data based on the transition of the lips motion and the lips motion pattern of the user or the partner according to the identifier of the user or the partner. The emotion presuming unit 10 presumes the emotions of the user and the partner respectively in the same manner mentioned as above, and sends the result together with the identifier of the user or the partner to the body motion control unit 12 and the facial expression control unit 13. The body motion control unit 12 determines the transition destination of the body motion of the user or the partner according to the identifier of the user or the partner, and sends the address and the frame number of the body motion data of the user or the partner together with the identifier thereof to the 3-D image drawing unit 14. The facial expression control unit 13 determines the transition destination of the expression of the user or the partner in the same manner, and sends the address and the frame number of the expression data of the user or the partner together with the identifier thereof to the 3-D image drawing unit 14.

The conversation is basically exchanged by turns. Therefore, the emotions of the user and the partner are presumed by the emotion presuming unit 10 based on what the partner said, and the presumption result is reflected on the body motions and the expressions of the CG characters of the user and the partner. Next, the emotion presumption result based on what the user said in response to the partner's speech is reflected on the body motions and the expressions of the CG characters of the user and the partner, and this processing is repeated by turns.

When the viewpoint change input unit 17 accepts an input, an image whose viewpoint is changed is generated in the same manner mentioned as above, and displayed on the display unit 15. As for the motion/expression input unit 16, the operation thereof for changing the partner's motion and expression has been described in the present embodiment. However, if the identifier indicating the user or the partner is attached when the input button for the user or the partner is pressed, in addition to the same processing performed by the data management unit 3, the CG characters of both user and partner can be changed according to the input to the motion/expression input unit 16.

Figure 7:
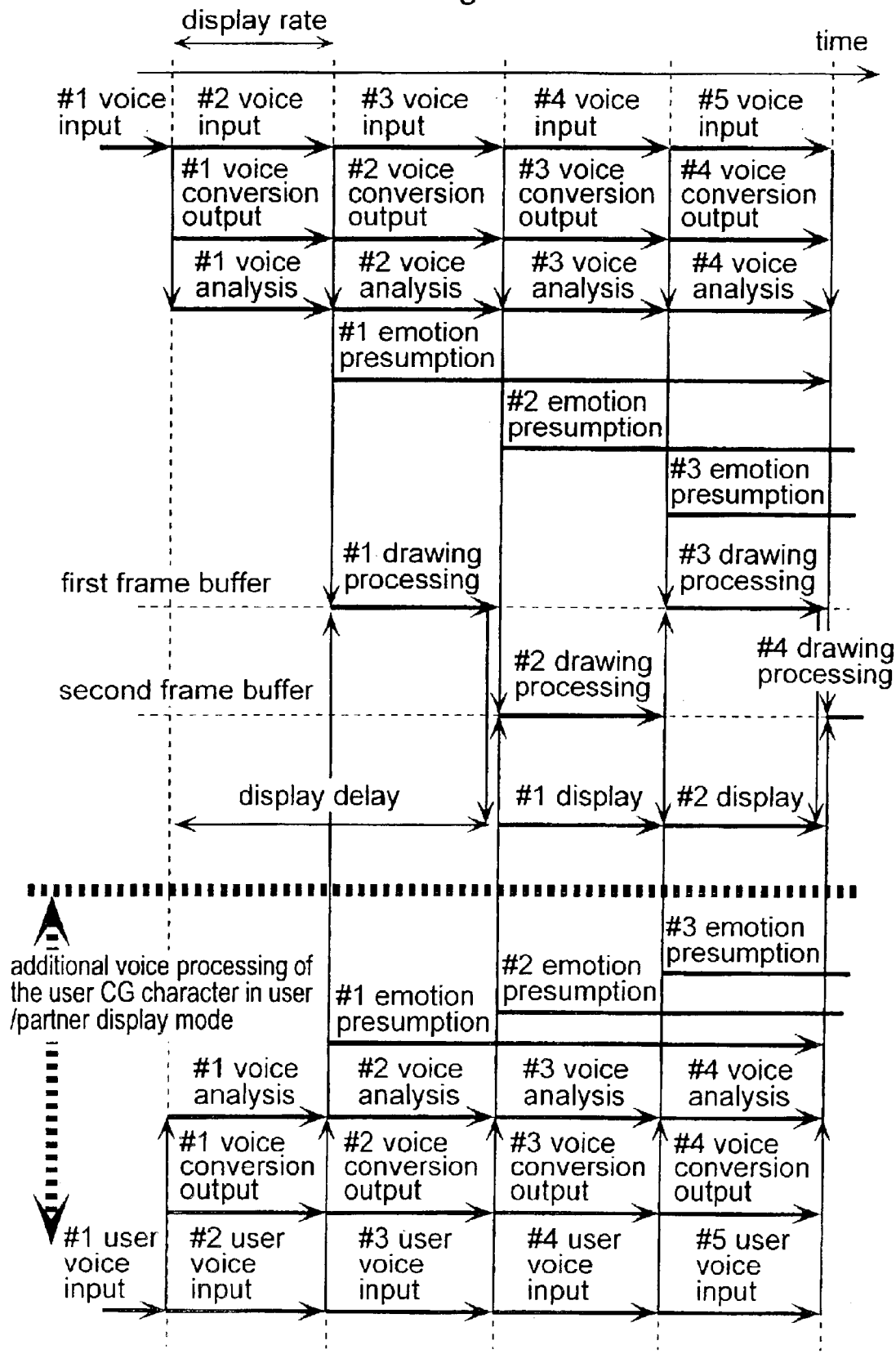
FIG. 7 is an explanatory diagram of pipeline processing and delay according to the present invention.

FIG. 7 shows a series of pipelined operations from the voice input through the image display described above. The processing result performed by the voice/music processing unit 5 is represented as voice conversion output, and the images are drawn using double buffers. As shown in FIG. 7, the lips motion of the CG character is displayed as the voice conversion output after a 2-frame delay at a display rate, but it is invisible because it is only about a 66 ms delay at a display rate of 30 frames/second, for instance. Also, the emotion presumption result is generated after a delay for 1 frame in addition to a predetermined storage period of the voice analysis result. When the voice analysis result is stored for the period of 3 frames as shown in FIG. 7, it causes a delay for 4 frames (about 134 ms at a display rate of 30 frames/second). However, it takes a considerable time for a real human being to generate his emotion in response to what the other says (it is presumed to take several hundred ms after he understands what the other says, although it depends on what he recognizes), so this delay is insignificant unless the storage period is considerably extended.

(The Second Embodiment)

The virtual television phone apparatus according to the second embodiment of the present invention will be explained with reference to drawings.

Figure 2:
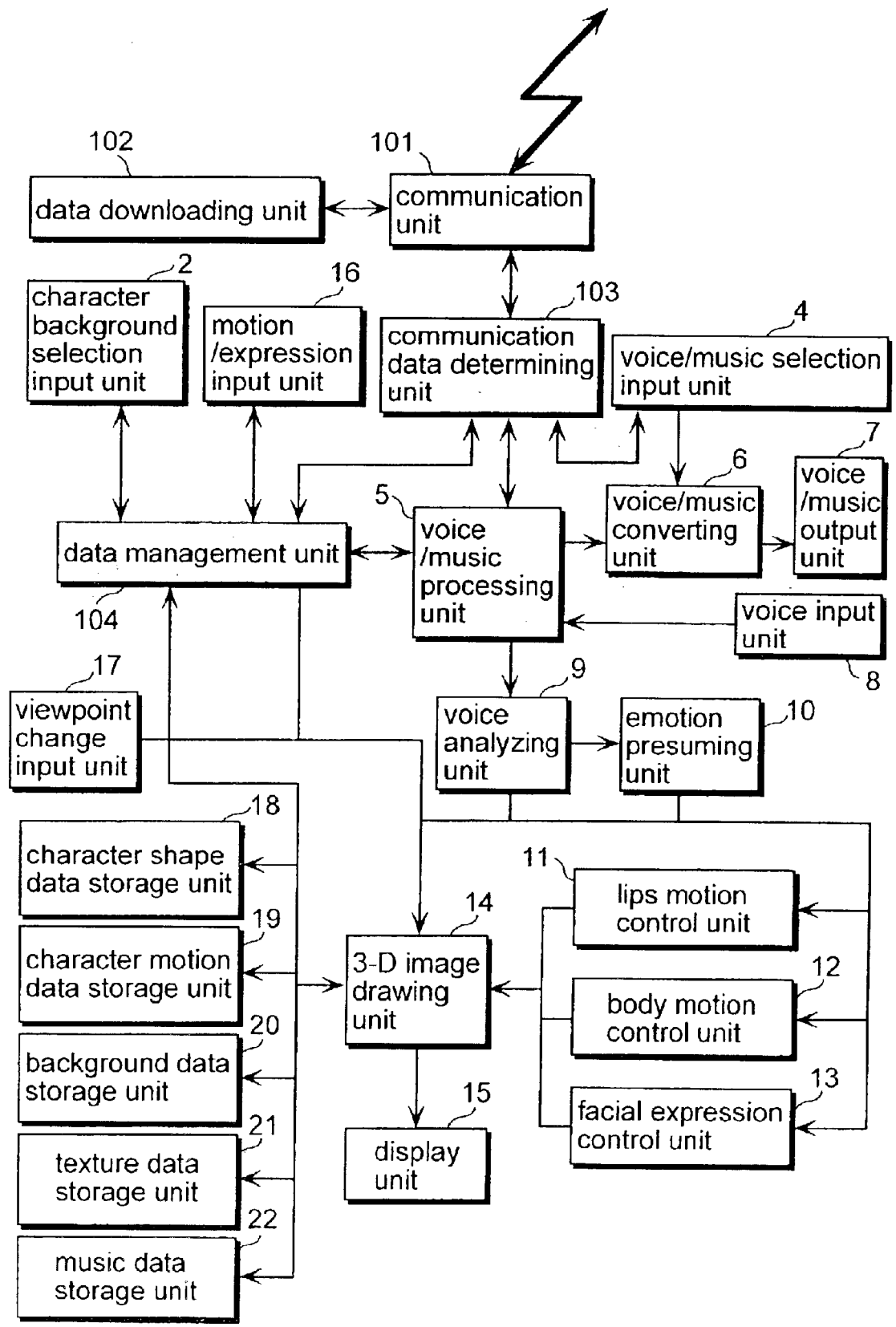
FIG. 2 is a block diagram showing a structure of a virtual television phone apparatus according to the second embodiment of the present invention.

FIG. 2 shows a structure of the virtual television phone apparatus according to the second embodiment of the present invention. It includes a communication unit 101, a data downloading unit 102, a communication data determining unit 103, the character background selection input unit 2, a data management unit 104, the voice/music selection input unit 4, the voice/music processing unit 5, the voice/music converting unit 6, the voice/music output unit 7, the voice input unit 8, the voice analyzing unit 9, the emotion presuming unit 10, the lips motion control unit 11, the body motion control unit 12, the facial expression control unit 13, the 3-D image drawing unit 14, the display unit 15, the motion/expression input unit 16, the viewpoint change input unit 17, the character shape data storage unit 18, the character motion data storage unit 19, the background data storage unit 20, the texture data storage unit 21 and the music data storage unit 22.

The virtual television phone apparatus according to the second embodiment of the present invention structured as above will be explained below in detail. Since it is different from that of the first embodiment only in its ability of downloading CG data, operation of downloading CG data will only be explained.

In the present embodiment, the CG character data (shape data, clothing texture data, expression pattern data and expression data, lips motion pattern data and lips motion data, and thumbnail image data), the body motion pattern data and body motion data, the background data and the music data are downloaded, but these data can be downloaded individually in the same manner.

The data downloading unit 102 accesses a server for storing data via the communication unit 101. It accesses the server in the same manner as normally downloading data to a cell phone or a personal computer. For example, the server is specified by the IP address, the server machine is notified of the access, and the procedure is followed according to the TCP/IP. Then, the list of aforementioned data stored in the server is sent according to HTTP or FTP and the data downloading unit 102 receives it. A user selects the data he wants to download from among the list. For example, the list is sent to the communication data determining unit 103 via the communication unit 101, the communication data determining unit 103 determines that the data is included in the list and sends it to the 3-D image drawing unit 14 via the data management unit 104. The 3-D image drawing unit 14 performs imaging of the list and sends it to the display unit 15 to display it, and the user can check the contents of the list.

The user selects the data via the data downloading unit 102. The communication unit 101 sends the name or the identifier of the selected data to the server according to the aforementioned protocol. The server sends the selected data file to the communication unit 101 according to aforementioned protocol, the communication data determining unit 103 determines that the data file is communicated and sends it to the data management unit 104. The data management unit 104 determines that the data is the CG character data, the body motion pattern data and body motion data, the background data or the music data, and specifies the data size. When the selection in the data downloading unit 102 is notified the data management unit 104 via the communication unit 101 and the communication data determining unit 103, the data management unit 104 does not need to determine the data contents because it is known in advance. Next, the data management unit 104 inquires free space for storing the data of the character shape data storage unit 18, the character motion data storage unit 19, the background data storage unit 20, the texture data storage unit 21 or the music data storage unit 22 depending upon the data contents, and when there is the free space in any of the storage units, it sends the data file to that storage unit. That storage unit stores the data file and sends the address of the data file to the data management unit 104. The data management unit 104 adds the data to be stored in the management table to the management table depending on the data contents. For example, as for the CG character data shown in FIG. 3, "4" is added as a CG character ID and the address sent back from the storage unit is described in the corresponding field. Other data is added and described in the same manner. After completion of adding the data to the management table, the notice of completion is sent to the data downloading unit 102 via the communication data determining unit 103 and the communication unit 101, the notice of completion of downloading is sent to the server via the communication unit 101, and thereby the data downloading processing ends.

When there is no free space for storing data, the data downloading unit 102 is notified via the communication data determining unit 103 and the communication unit 101. The data downloading unit 102 notifies the user that there is no storage space (displays it on the display unit 15, for instance). The notice of completion of downloading the data is sent to the data downloading unit 102 via the communication data determining unit 103 and the communication unit 101 in the same manner as mentioned above, the notice of completion of downloading the data is sent to the server via the communication unit 101, and thereby the data downloading processing ends.

When the voice data is communicated, the communication data determining unit 103 determines that it is the voice data and sends it to the voice/music processing unit 5.

The first and second embodiments of the present invention can be realized as a program for an apparatus having a voice communication unit, a display unit, a voice input/output unit, a central processing unit and a memory. The apparatus is, for instance, a cell phone, a pocket computer, a tabletop telephone with a display unit, an in-vehicle terminal with a communication function, or a personal computer. The apparatus with a dedicated 3-D image processing device, voice input/output device and voice processing device can perform the processing at higher speed. It is effective to use a personal computer having a 3-D graphics board and a sound blaster board. A CRT, a liquid crystal display, an organic EL or the like can be used as the display unit 15, irrespective of type thereof.

Figure 8A:
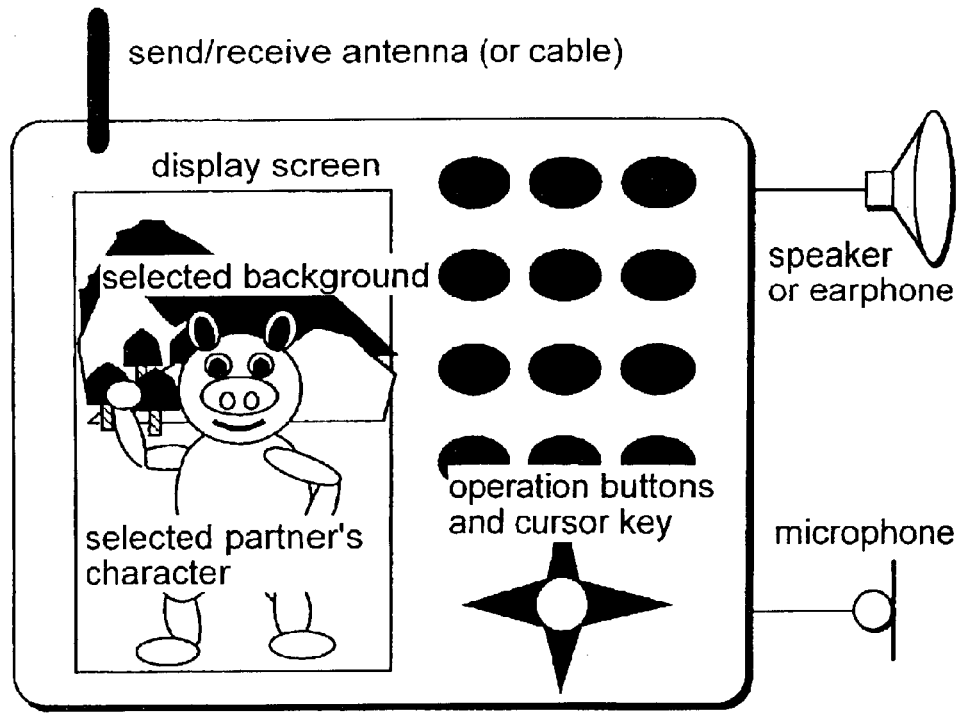
FIGS. 8A and 8B are schematic diagrams of the present invention.
Figure 8B:
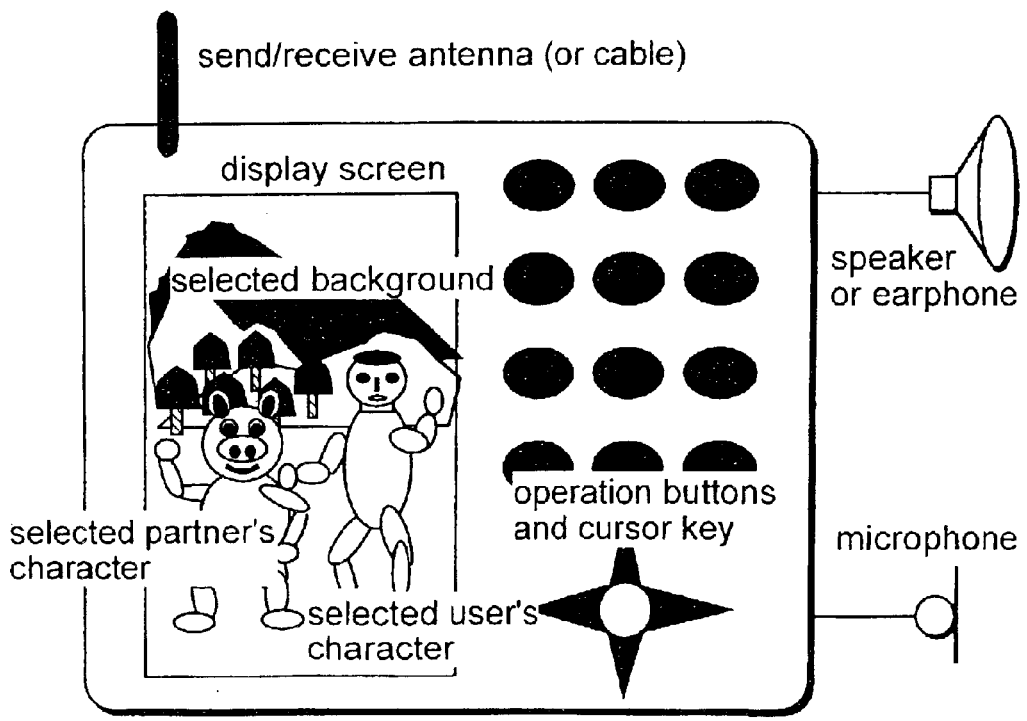

FIGS. 8A and 8B show a schematic diagram of the virtual television phone apparatus according to the present invention. Using the apparatus structured as above, a user can display his selected CG character corresponding to the communication partner to enjoy conversation with the CG character. Using another apparatus, the user can also display his own CG character to enjoy conversation in the virtual space. The CG character which is making the preset motion can be displayed both before and after starting conversation.

Figure 10A:
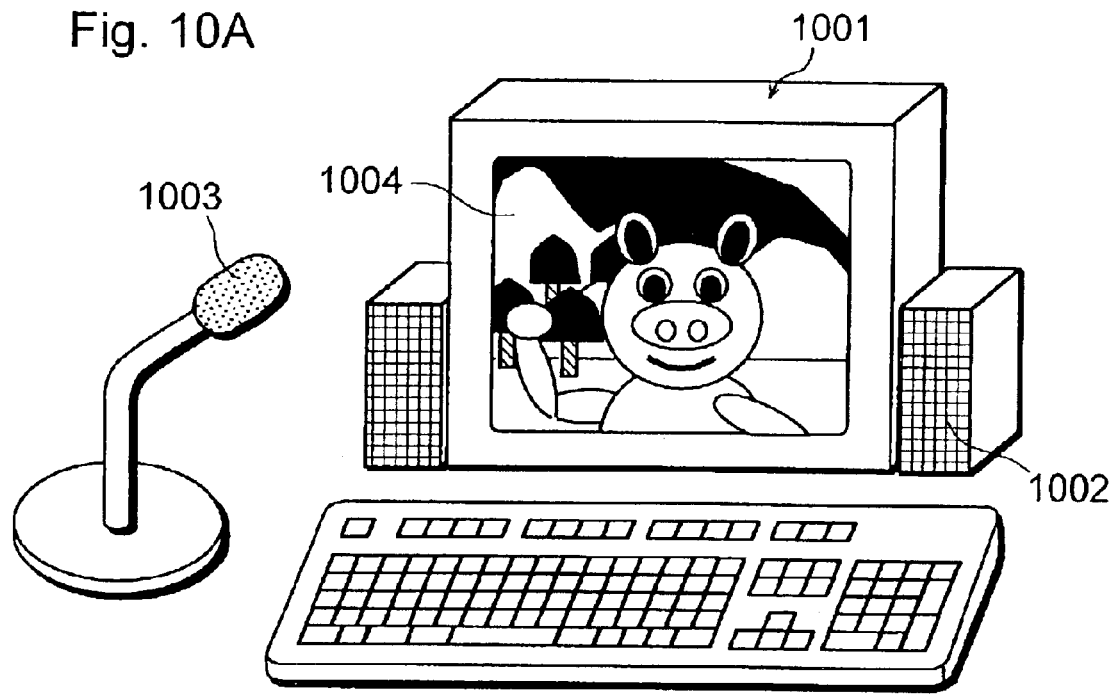
FIG. 10A is a reference diagram showing another usage manner of the first and second embodiments of the present invention.

FIG. 10A is a diagram showing a personal computer (PC) 1001 having the virtual television phone function of the present invention. The PC 1001 includes a speaker 1002 and a microphone 1003.

When a user selects at least one character of the user and the partner and starts conversation, the emotion presuming unit 10 presumes the emotion based on the voices uttered during the conversation. The CG character displayed on the screen 1004 changes its motion and expression according to that emotion presumption, the more enjoyable virtual television phone apparatus can be realized. Also, since the user of the PC 1001 can freely select the character and voice tone of the partner, the PC 1001 having the virtual television phone function with higher entertainment value added can be realized.

Figure 10B:
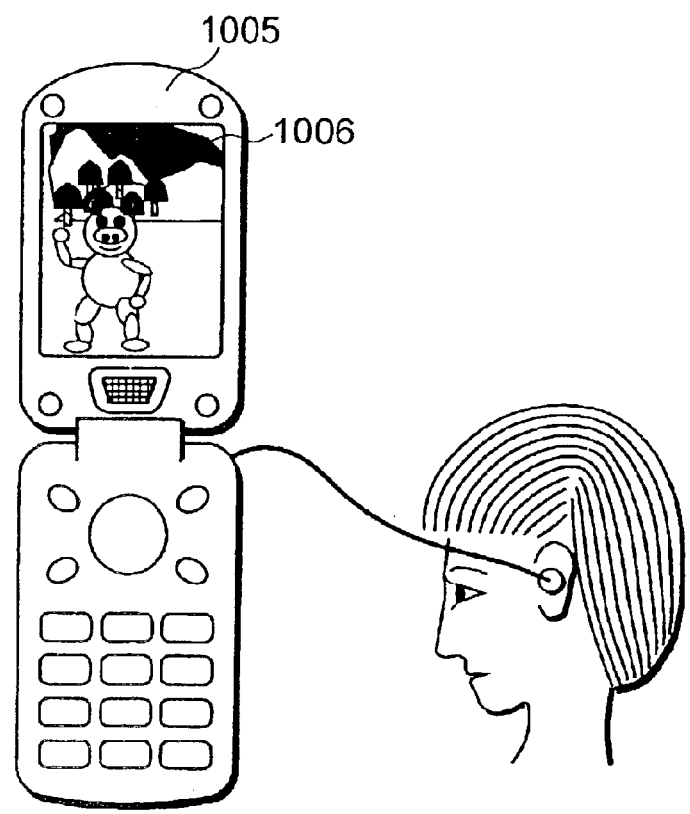
FIG. 10B is a reference diagram showing sill another usage manner of the first and second embodiments of the present invention.

FIG. 10B is a diagram showing a cell phone 1005 having the virtual television phone function of the present invention. The cell phone 1005 has a handsfree function, and displays the selected character which is making the motion based on the emotion presumption on the screen 1006. Therefore, the cell phone 1005 having the virtual television phone function with higher entertainment value added can be realized.

Figure 11:
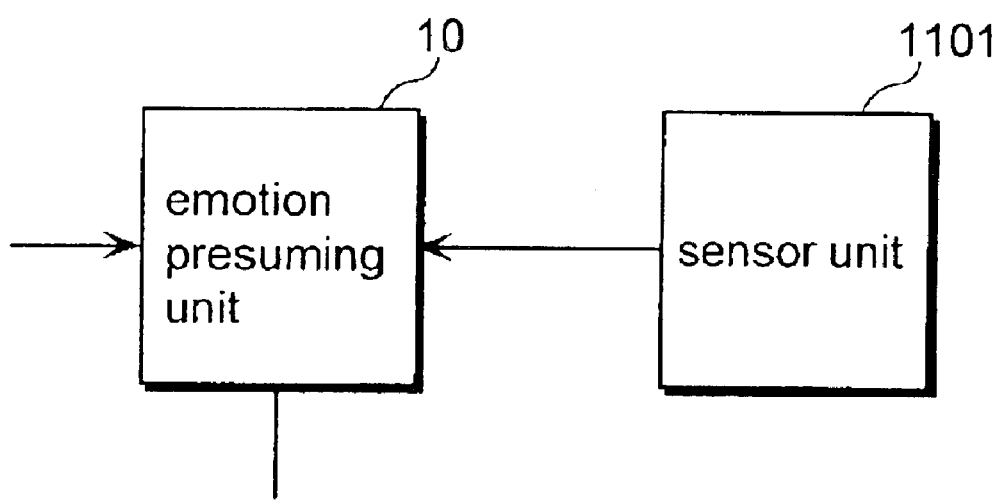
FIG. 11 is a block diagram showing a sensor unit which is added to the virtual television phone apparatus according to the present invention.

In order to improve the emotion presumption function of the present invention, a new sensor unit can be added to the virtual television phone apparatus. FIG. 11 is a block diagram showing a sensor unit 1101 which is added to the virtual television phone apparatus shown in FIG. 1 or FIG. 2. The sensor unit 1101 is a processing unit for detecting the changes of the user's body temperature, heartbeat, strength gripping the cell phone and others and conveys the changes to the emotion presuming unit 10. For example, when the sensor unit 1101 detects the change of the user's temperature via a thermistor and conveys it to the emotion presuming unit 10, it is believed that the emotion presuming unit 10 presumes the emotion more reliably using the temperature change that is a new parameter for emotion presumption.

Figure 12A:
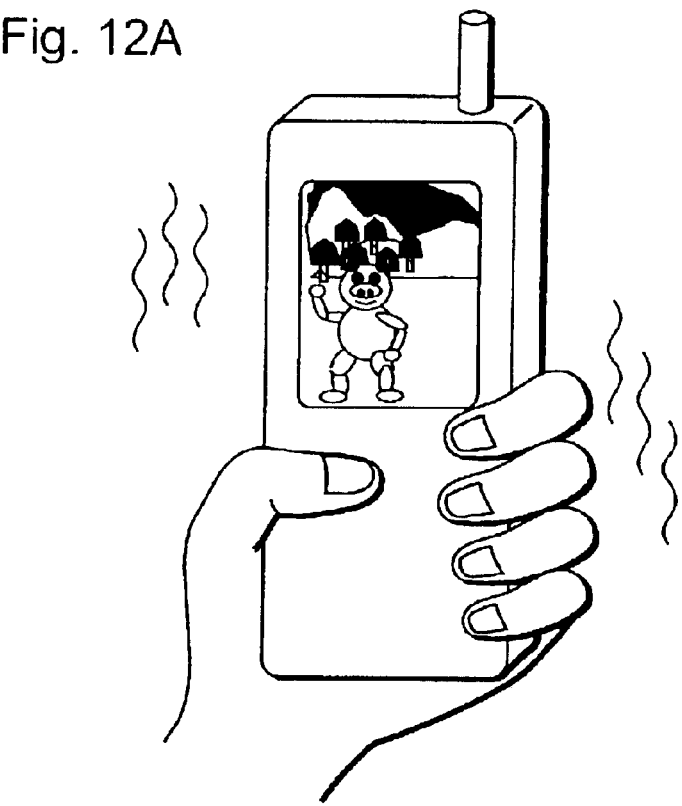
FIG. 12A is a diagram showing an example of how to use a cell phone having various sensor units for emotion presumption.
Figure 12B:
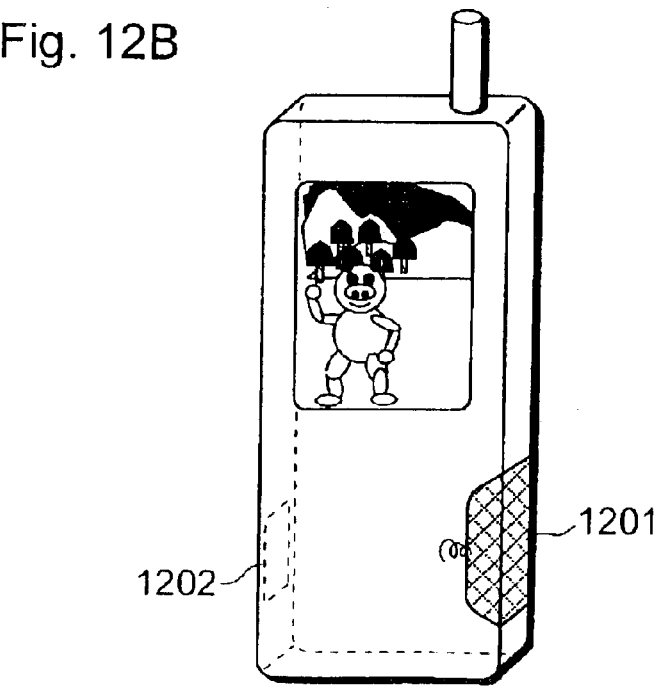
FIG. 12B is a reference diagram showing a cell phone having various sensor units for emotion presumption.

FIG. 12A is a diagram showing an example of how to use a cell phone having various sensor units for emotion presumption. The cell phone includes a grip measurement unit 1201 for detecting the user's grip change. FIG. 12B is a reference diagram showing a cell phone having various sensor units for emotion presumption. The cell phone includes the grip measurement unit 1201 and a thermistor 1202 for measuring the user's temperature change. According to this cell phone, it is believed that the emotion is presumed more reliably using a new parameter in addition to the voice data mentioned above.

The present invention is not limited to each of the aforementioned embodiments, but can be embodied in its applicable range thereof. In the present embodiments, the virtual television phone apparatus has been explained on the assumption that at least one of the characters of the user and the communication partner is displayed on the screen. However, it can be realized as a virtual television phone apparatus that presumes emotions over the communication among a lot of people such as PC communication and displays a lot of characters accompanied by the emotion presumption.

Also, it is conceivable to reflect the result of the emotion presumption in music data and control the expressions and body motions of the CG character by outputting the corresponding music, such as gloomy, cheerful, pleasant, and rhythmic music.

According to the above-mentioned structure, the present invention displays a communication partner as a virtual 3-D CG character selected by a user receiver and uses the partner's speech, so that the voice conversation with the virtual 3-D CG character can be realized. Therefore, a new communication terminal can be realized with more amusing voice conversation in another approach than the functions of 'seeing a communication partner's face or seeing a visual image similar to the partner's face" and "acting as a virtual character." Also, the present invention can realize a telephone conversation apparatus with a display device that realizes conversation in virtual space without using a server or the like in above-mentioned related arts. In addition, since data can be downloaded to the apparatus of the present invention, the CG data can be updated. The user can enjoy conversation with various CG characters by changing the CG character and the voice of even the same partner.

Furthermore, since the user receiver can select his own character as well as the partner's character and make the characters express their emotions in accordance with the telephone conversation based on the emotion presumption function, a new virtual television phone apparatus with higher entertainment value can be realized.

As described above, it is believed that the present invention brings about an enormous effect, that is, new amusement and delight to conversation over the voice conversation apparatus.

What is claimed is:

1. A virtual television phone apparatus comprising:
    a communication unit operable to carry out voice communication;
    a character selecting unit operable to select CG character shape data for at least one of a user and a communication partner;
    a voice input unit operable to acquire voice of the user;
    a voice output unit operable to output voice of the communication partner;
    a voice analyzing unit operable to analyze voice data of the communication partner received by the communication unit or both of the voice data of the communication partner and voice data of the user;
    an emotion presuming unit operable to presume an emotion state of the communication partner or emotion states of both of the communication partner and the user using a result of the voice analysis by the voice analyzing unit;
    a motion control unit operable to control a motion of the CG character based on the presumption by the emotion presuming unit;
    an image generating unit operable to generate an image using the CG character shape data and motion data generated based on control information generated by the motion control unit; and
    a displaying unit operable to display the image generated by the image generating unit.

2. The virtual television phone apparatus according to claim 1,
    wherein the emotion presuming unit notifies the motion control unit of a result of the presumption by the emotion presuming unit, and
    the motion control unit generates the motion data based on the notice.

3. The virtual television phone apparatus according to claim 1,
    wherein the motion control unit includes a lips motion control unit operable to generate lips motion control information of the CG character data based on a result of the voice analysis by the voice analyzing unit, and the image generating unit generates the image using the CG character shape data and the lips motion data generated based on control information generated by the lips motion control unit.

4. The virtual television phone apparatus according to claim 3,
wherein the emotion presuming unit notifies the lips motion control unit of a result of the presumption by said emotion presuming unit, and
the lips motion control unit generates the lips motion data based on the notice.

5. The virtual television phone apparatus according to claim 4 further comprising:
a storage unit operable to store the lips motion data; and
a unit operable to download the lips motion data from an external device and store said lips motion data in the storage unit.

6. The virtual television phone apparatus according to claim 4 further comprising:
a storage unit operable to store lips motion pattern data; and
a unit operable to download the lips motion pattern data from an external device and store said lips motion pattern data in the storage unit.

7. The virtual television phone apparatus according to claim 1,
wherein the motion control unit includes a body motion control unit operable to control a body motion of the CG character, and
the image generating unit generates the image using body motion data generated by the body motion control unit based on body motion control information.

8. The virtual television phone apparatus according to claim 7,
wherein the emotion presuming unit notifies the body motion control unit of a result of the presumption by said emotion presuming unit, and
the body motion control unit generates the body motion data based on the notice.

9. The virtual television phone apparatus according to claim 8 further comprising:
a storage unit operable to store the body motion data; and
a unit operable to download the body motion data from an external device and store said body motion data in the storage unit.

10. The virtual television phone apparatus according to claim 8 further comprising a selecting unit operable to select body motion pattern data which defines a specific body motion,
wherein the body motion control unit controls the body motion based on the body motion pattern data selected by the selecting unit.

11. The virtual television phone apparatus according to claim 9 further comprising:
a storage unit operable to store body motion pattern data; and
a unit operable to download the body motion pattern data from an external device and store said body motion pattern data in the storage unit.

12. The virtual television phone apparatus according to claim 8 further comprising a unit operable to decide the body motion of the CG character and control start of said body motion.

13. The virtual television phone apparatus according to claim 1,
wherein the motion control unit includes an expression control unit operable to control an expression of the CG character, and
the image generating unit generates an image using expression data generated by the expression control unit based on expression control information.

14. The virtual television phone apparatus according to claim 13,
wherein the emotion presuming unit notifies the expression control unit of a result of the presumption by said emotion presuming unit, and
the expression control unit generates the expression data based on the notice.

15. The virtual television phone apparatus according to claim 14 further comprising:
a storage unit operable to store the expression data; and
a unit operable to download the expression data from an external device and store said expression data in the storage unit.

16. The virtual television phone apparatus according to claim 14 further comprising:
a storage unit operable to store expression pattern data; and
a unit operable to download the expression pattern data from an external device and store said expression pattern data in the storage unit.

17. The virtual television phone apparatus according to claim 14 further comprising a unit operable to decide the expression of the CG character and control start of said expression.

18. The virtual television phone apparatus according to claim 1 further comprising a voice converting unit operable to convert the received voice of the communication partner into another voice.

19. The virtual television phone apparatus according to claim 18 further comprising a voice selection input unit operable to select quality of the voice of the communication partner when the voice converting unit converts said voice into another voice.

20. The virtual television phone apparatus according to claim 1,
wherein the image generating unit generates an image of the CG character of the communication partner upon receipt of calling from said partner, and
the display unit displays the image of the CG character during the period from the receipt of the calling until start of voice communication to inform the user of a voice communication waiting state.

21. The virtual television phone apparatus according to claim 1,
wherein the voice output unit outputs music data corresponding to the communication partner upon receipt of the calling from said partner to inform the user of a voice communication waiting state.

22. The virtual television phone apparatus according to claim 21 further comprising:
a storage unit operable to store the music data; and
a unit operable to download the music data from an external device and store said music data in the storage unit.

23. The virtual television phone apparatus according to claim 1,
wherein the image generating unit generates an image using background data.

24. The virtual television phone apparatus according to claim 23 further comprising a background selecting unit operable to select the background data.

25. The virtual television phone apparatus according to claim 24 further comprising:
a storage unit operable to store the background data; and
a unit operable to download the background data from an external device and store said background data in the storage unit.

26. The virtual television phone apparatus according to claim 1,
wherein the image generating unit generates a three-dimensional image.

27. The virtual television phone apparatus according to claim 1 further comprising:
a storage unit operable to store clothing texture data of the CG character; and
a unit operable to download the clothing texture data of the CG character from an external device and store said clothing texture data in the storage unit.

28. The virtual television phone apparatus according to claim 1 further comprising:
a storage unit operable to store the CG character shape data; and
a unit operable to download the CG character shape data from an external device and store said CG character shape data in the storage unit.

29. The virtual television phone apparatus according to claim 1 further comprising a selecting unit operable to select a display mode indicating whether the CG character is displayed or not.

30. The virtual television phone apparatus according to claim 29,
wherein the display mode is one of a communication partner display mode for displaying the CG character of the communication partner only, a concurrent display mode for displaying both the CG characters of the communication partner and the user, and a non-display mode for not displaying the CG character.

31. The virtual television phone apparatus according to claim 1 further comprising a viewpoint changing unit operable to display the CG character from a viewpoint according to the user's instruction.

32. A virtual television phone system for communicating between at least a communication device of a user and a communication device of a communication partner, the system comprising at least the communication device of the user and the communication device of the communication partner,
wherein the communication device includes:
a communication unit operable to carry out voice communication;
a character selecting unit operable to select CG character shape data for at least one of a user and a communication partner;
a voice input unit operable to acquire voice of the user;
a voice output unit operable to output voice of the communication partner;
a voice analyzing unit operable to analyze voice data of the communication partner received by the communication unit or both of the voice data of the communication partner and voice data of the user;
an emotion presuming unit operable to presume an emotion state of the communication partner or emotion states of both of the communication partner and the user using a result of the voice analysis by the voice analyzing unit;
a motion control unit operable to control a motion of the CG character based on the presumption by the emotion presuming unit;
an image generating unit operable to generate an image using the CG character shape data and motion data generated based on control information generated by the motion control unit; and
a displaying unit operable to display the image generated by the image generating unit.

33. The virtual television phone system according to claim 32,
wherein the emotion presuming unit notifies the motion control unit of a result of the presumption by said emotion presuming unit, and
the motion control unit generates the motion data based on the notice.

34. A program in a storage medium for virtual television phone communication between at least a communication device of a user and a communication device of a communication partner by communication between the user and the communication partner, the program comprising:
a communication step for carrying out voice communication;
a character selecting step for selecting CG character shape data for at least one of the user and the communication partner;
a voice input step for acquiring voice of the user;
a voice output step for outputting voice of the communication partner;
a voice analyzing step for analyzing voice data of the communication partner received in the communication step or both of the voice data of the communication partner and voice data of the user;
an emotion presuming step for presuming an emotion state of the communication partner or emotion states of both of the communication partner and the user using a result of the voice analysis in the voice analyzing step;
a motion control step for controlling a motion of the CG character based on the presumption in the emotion presuming step;
an image generating step for generating an image using the CG character shape data and motion data generated based on control information generated in the motion control step; and
a displaying step for displaying the image generated in the image generating step.

35. The program according to claim 34,
wherein in the motion control step, the motion data is generated based on a result of the presumption in the emotion presuming step.

* * * * *